United States Patent
Oz et al.

(10) Patent No.: US 7,181,759 B2
(45) Date of Patent: Feb. 20, 2007

(54) SYSTEM AND METHOD FOR PROVIDING INTERACTIVITY FOR END-USERS OVER DIGITAL BROADCAST CHANNELS

(75) Inventors: Ran Oz, Modiin (IL); Nery Strasman, Ramat Gan (IL)

(73) Assignee: Bigband Networks, Inc., Redwood City, CA (US)

( * ) Notice: Subject to any disclaimer, the term of this patent is extended or adjusted under 35 U.S.C. 154(b) by 1179 days.

(21) Appl. No.: 09/903,980

(22) Filed: Jul. 11, 2001

(65) Prior Publication Data

US 2002/0059638 A1 May 16, 2002

Related U.S. Application Data

(63) Continuation-in-part of application No. 09/579,551, filed on May 26, 2000, now Pat. No. 6,434,141.

(51) Int. Cl.
H04N 7/16 (2006.01)
H04N 7/173 (2006.01)
H04L 12/66 (2006.01)
H04L 12/28 (2006.01)
H04L 12/56 (2006.01)

(52) U.S. Cl. ............... 725/119; 725/136; 370/352; 370/422

(58) Field of Classification Search ............ 725/136, 725/119; 370/352, 422
See application file for complete search history.

(56) References Cited

U.S. PATENT DOCUMENTS

| | | | |
|---|---|---|---|
| 5,682,195 A | 10/1997 | Hendricks et al. ............ 348/6 |
| 5,768,539 A * | 6/1998 | Metz et al. ................. 709/249 |
| 5,915,090 A * | 6/1999 | Joseph et al. ............... 709/202 |
| 6,052,145 A | 4/2000 | Macrae et al. ................ 348/10 |
| 6,055,560 A * | 4/2000 | Mills et al. .................. 709/200 |
| 6,233,734 B1 | 5/2001 | Macrae et al. ................ 725/50 |
| 6,240,553 B1 * | 5/2001 | Son et al. ..................... 725/95 |
| 6,240,555 B1 * | 5/2001 | Shoff et al. ................. 725/110 |
| 2002/0138848 A1 * | 9/2002 | Alao et al. .................. 725/109 |
| 2004/0261127 A1 * | 12/2004 | Freeman et al. ............ 725/135 |
| 2006/0064728 A1 * | 3/2006 | Son et al. ..................... 725/86 |

FOREIGN PATENT DOCUMENTS

| | | |
|---|---|---|
| WO | WO 99/30493 | 6/1999 |
| WO | WO 99/35831 | 7/1999 |
| WO | WO 00/07309 | 2/2000 |
| WO | WO 00/24198 | 4/2000 |
| WO | WO 00/33560 | 6/2000 |
| WO | WO 01/01690 | 1/2001 |

\* cited by examiner

*Primary Examiner*—Chris Kelley
*Assistant Examiner*—Johnny Ma
(74) *Attorney, Agent, or Firm*—Sonnenschein, Nath & Rosenthal LLP

(57) ABSTRACT

A system and method for allowing an end-user to interact with a system in order to execute an application. Multiple application packets are broadcast to a plurality of end-users, such that the upstream transmission of data from end-users is greatly reduced. Each end-ser further receives media packets, whereas visual objects relating to the application can be displayed on an end-user display unit with visual objects originating from the media packets.

20 Claims, 17 Drawing Sheets

SYSTEM AND METHOD FOR PROVIDING INTERACTIVITY FOR END-USERS OVER DIGITAL BROADCAST CHANNELS

RELATED CASES

This patent application is a Continuation-In-part of U.S. patent application Ser. No. 09/579,551 Filed May 26, 2000.

This patent application incorporates by reference U.S. patent application Ser. No. 09/595,624 Filed Jun. 16, 2000.

FIELD OF THE INVENTION

The present invention relates to communication systems and methods in general, and to methods and systems for providing interactivity for end-users over digital broadcast channels, in particular.

BACKGROUND OF THE INVENTION (I) Upstream Channel Limitations

Some prior art methods and systems allow for providing interactivity between an end-user, such as a video information user equipped with a set-top-box, and video providers or other service providers over networks, such as broadband networks.

The interaction between the end-user and the service provider involves sending various signals, such as media signals, control and status signals from an end-user (upstream) to the service provider and to the end-user (downstream). The upstream capacity is much more limited than the downstream capacity.

There is a need to provide a system and method for providing interactivity that reduces the amount of signals sent via upstream channels.

Many systems and methods for providing interactivity are based upon the TCP/IP suit of communication protocols or other communication protocols that provide reliability. The TCP/IP suit of protocols includes a transport layer that provides for reliability and integrity of a communication link. The reliability and integrity are achieved by exchanging messages, such as acknowledge messages and the like, both downstream and upstream. Accordingly, the use of TCP/IP suite of protocols or other communication protocols that require the exchange of messages further limits the availability of upstream channels.

There is a need to provide a system and method for providing interactivity that affords relatively reliable provision of downstream signals, without loading the upstream channels.

(II) Providing On-Screen Menus to a Large Number of Set-Top-Boxes.

The provision of on screen menus and allowing an end-user to interact has various advantages. First, the provision of menus eases the interaction between an end-user and a service provider. Second, the provision of menus can reduce the computational load on the set-top-box that usually has limited processing resources. U.S Pat. No. 6,055,560 of Mills et al. describes a very complex system and method to provide interactivity for a networked video server. The system has a packet switched network for switching control signals, a video switched network for allowing to provide video programs, and at least two level gateways for establishing sessions and for interchanging signals between the packet switched network and the video switched network. The system has a plurality of application engines, a plurality of application tables, a shared queue, a multitasking operating system, set-top-box application tables and an application server code for allowing to interact with set-top-boxes. Each application table tracks a status of a single set-top-box in implementing the application. The application engines take turns in accessing the shared queue to retrieve event reports that are forwarded by the set-top-boxes. Each application involves displaying a panel (visual content) on a television set and reacting to events, such as a reception of inputs provided by a viewer of the television set. An execution of an application requires the set-top-box to provide relatively many upstream signals. The signals are stored in the shared queue. Each time a user turns on a set-top-box to initiate some kind of interaction with the system and each time the television is turned on a video dial tone is provided by the set-top-box over a video dial tone network.

The system described in U.S. Pat. No. 6,055,560 has some disadvantages. First, it requires exchanging relatively many signals with each set-top-box. As the available bandwidth of the upstream channels is very limited, the system is not suited to handle a very large number of set-top-boxes. Second, tracking the status of a very large number of set-top-boxes and managing multiple application engines in view of the status of a large number of set-top-boxes is very complicated, very costly and is not effective. The system and method are uni-cast oriented and not broadcast oriented. Third, as each set-top-box is connected to two distinct networks (video switched network and packet switched network) over two distinct connections, for receiving data and video signals, each set-top-box needs to have two tuners, one for receiving video and the other for receiving data. Accordingly, the system and method described in U.S. Pat. No. 6,055,560 are not adjusted to operate in conjunction with set-top-boxes that have a single tuner.

There is a need to provide a system and method for allowing interactivity between set-top-boxes and a service provider that is adapted to handle a very large number of set-top-boxes. There is a need to provide an efficient, and cost effective system and method for allowing interactivity between set-top-boxes and a service provider. There is a need to implement a method that does not require a constant tracking of a set-top-boxes status in implementing an application. There is a need to implement a method that simplifies the process of presenting predefined images upon a display unit coupled to a set-top-box. There is a need to provide a system and method that reduces the load on the processing and memory resources of the set-top-box.

(III) Single Tuner Set-Top-Box Limitations

Broadband communication systems are known in the art. The main types include video oriented communication systems and data oriented communication systems. Video oriented communication systems were originally designed for television broadcast transmissions and today include modifications, which enable narrowcast transmissions as well as data communications there through. Data oriented communication systems are used for a plurality of data and multimedia application packets. Conventionally, downstream channels (from the cable service operator to the end-user) are used to carry either only IP packets or only native MPEG programs over MPEG transport. This requires the cable operator to perform fixed allocation of downstream resources for different services, which limits the resource usage efficiency, especially for the downstream bandwidth.

Cable Modem Termination Systems (CMTS) are known in the art. Such systems are installed in a cable head-end and are connected to a plurality (conventionally thousands) of Cable Modems (CM) via a Hybrid Fiber/Coaxial (HFC)

Network. A conventional single CMTS board transmits downstream information on a single channel and receives upstream information from one or more (usually not more than 8) upstream channels. Upstream channels that are connected to a single CMTS board can be received from many nodes (usually for areas which are characterized by a small number of cable modem users) or from a single node (usually for areas which are characterized by a large number of cable modem users).

The operation of a conventional CMTS is generally predefined, where the cable modem users are configured to utilize a specific CMTS downstream channel. Each CMTS downstream channel has specific associated upstream channels. The CMTS board uses its associated downstream channel, to provide upstream channels and time slot information to the CMs on which they can transmit information back to the head-end, at any given time.

An article, "Multimedia Traffic Engineering for HFC Networks" by John T. Chapman from Cisco Systems (Nov. 29, 1999), discusses possible CMTS architectures contingent on penetration of CMs and broadband services.

Digital video and other media are typically transmitted in a compressed form, encapsulated in MPEG transport packets, which include information associating them to a specific stream. In general, digital transmission dramatically increases the potential network capacity. Ten to twenty digital video channels can be transmitted using a communication channel. Digital transmission further provides data transmission, and MPEG transport.

New generations of set-top-boxes (STB's) includes two downstream tuners, one for video, one for data (e.g., these STB's are equipped with a cable modem). The ability to transmit video and data combined together leads to a new class of applications, which are classified under Interactive TV (or sometime referred too as Enhanced TV). For set-top devices that have two different paths one for video and one for data, interactive applications that are very trivial to implement, although the implementations can be limited by upstream constraints, as mentioned in section (i).

There is a need to provide a method and system for allowing interactivity between single tuner set-top-boxes and a service provider.

SUMMARY OF THE PRESENT INVENTION

The invention provides a system and method for provisioning of media packets and application packets to at least one group of end-users, each end-user has a display unit and a control unit for controlling the display unit. The application packets allow for displaying visual objects, for manipulating the visual objects, or for responding to events initiated by the end-users.

The invention provides a method and a system that can be implemented in a broadcast environment and are suited to handle a very large number of set-top-boxes.

The invention provides a system and method that require a very thin client at the set-top-box. The very thin client is configured to receive application packets, filter out irrelevant application packets and process the relevant application packets to control a display of visual objects, manipulate the visual objects, and respond to events initiated by the end-users. Conveniently, the very thin client is implemented as a stateless machine, as the very thin client does not need to "remember" previous machine states.

Each application requires that an application packet group be received by an end-user. The application packets are filtered and processed for allowing the display of visual objects belonging to a sequence of logically linked visual objects, for manipulating the visual objects or for selecting between logically linked visual objects in response to events initiated by an end-user. A visual object can include text. Accordingly, the amount of upstream transmitted information from the end-user is greatly reduced, and many events amount in a selection of application packets. Furthermore, according to an aspect of the invention there is no need to track the set-top-box status in implementing applications, thus greatly simplifying the application management.

According to an aspect of the invention each application packet is retransmitted, thus allowing for reliability without a need in sending upstream acknowledge signals and the like. The reliability is further enhanced as the application packets are self contained, and each is responsive to only a portion of a visual object. Accordingly, a loss of an application packet influences only a portion of the visual object. The lost application packet can be replaced by a retransmitted application packet.

According to an aspect of the invention the system includes (a) an application packet generator, for generating application packets, (b) a transmitter, coupled between the application packet generator and a communication medium, for transmitting application packets over the communication medium to a plurality of end-users, the end-users have a set-top-box coupled to a display unit, the very thin client allows for receiving, filtering and processing the application packets to control a display of visual objects, for manipulating the visual objects, or for responding to events initiated by the end-users. Conveniently, the transmitter further comprises a transmission analyzer for analyzing the transmissions to end-users and determining the transmission characteristics of the application packet.

According to an aspect of the invention, the invention provides a system that includes: (a) a router, coupled to the control unit of the end-users, the router operative to receive application packets and media packets, and to provide group-associated application packets and media packets to control units of a group of end-users; (b) a session manager, coupled to the router, the session manager providing routing instructions to said router, for dynamically selecting group-associated application packets and media packets out of the received application packets and media packets. Wherein the control unit of each end-user is configured to process the application packets and accordingly either to (i) display at least a portion of visual objects on the display unit, (ii) react to events that are related to the display of the at least one portion of the visual objects on the display unit, or even to (III) manipulate the at least one portion of the visual object.

The invention provides a system for allowing an end-user to interact with an application provider, the system including: (I) A broadband multimedia system, configured to (a) receive a plurality of media packets and application packets from media sources and application providers, (b) select media packets and application packets to be provided to a plurality of end-users, via a communication medium, (c) provide the selected media packets and application packets to a plurality of end-users. (II) A communication medium, coupled between the broadband multimedia system and the plurality of end-users.

The invention provides a set-top-box configured to interact with a broadband media system via a communication medium, the set-top-box including: (A) A tuner, coupled to communication channel, for receiving application packets and media packet. (B) A filter, coupled to the tuner, for filtering received application packets and media packets, and providing the application packets to a processor. Conveniently the filter includes an MPEG parser. (C) A processor, coupled to a display unit, configured to process the application packets and accordingly to determine (i) to display at least a portion of visual objects on the display unit, or (ii) react to events that are related to the display of the at least one portion of the visual objects on the display unit, and even (iii) to manipulate at least portion of the visual object.

The invention provides a method for generating and providing application packets to end-users, each end-user has a display unit and a control unit, the control unit configured to control the display unit, the method including the steps of: (1) Selecting application code portions to be embedded in application packets. (2) Multiplexing the selected application code portions to form at least one application packet group. The control unit of each end-user is configured to process the application packets of an application packet group out of the at least one application packet group, and accordingly (i) display at least a portion of a visual object on the display unit, or (ii) react to events that are related to the display of the at least portion of the visual object on the display unit.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
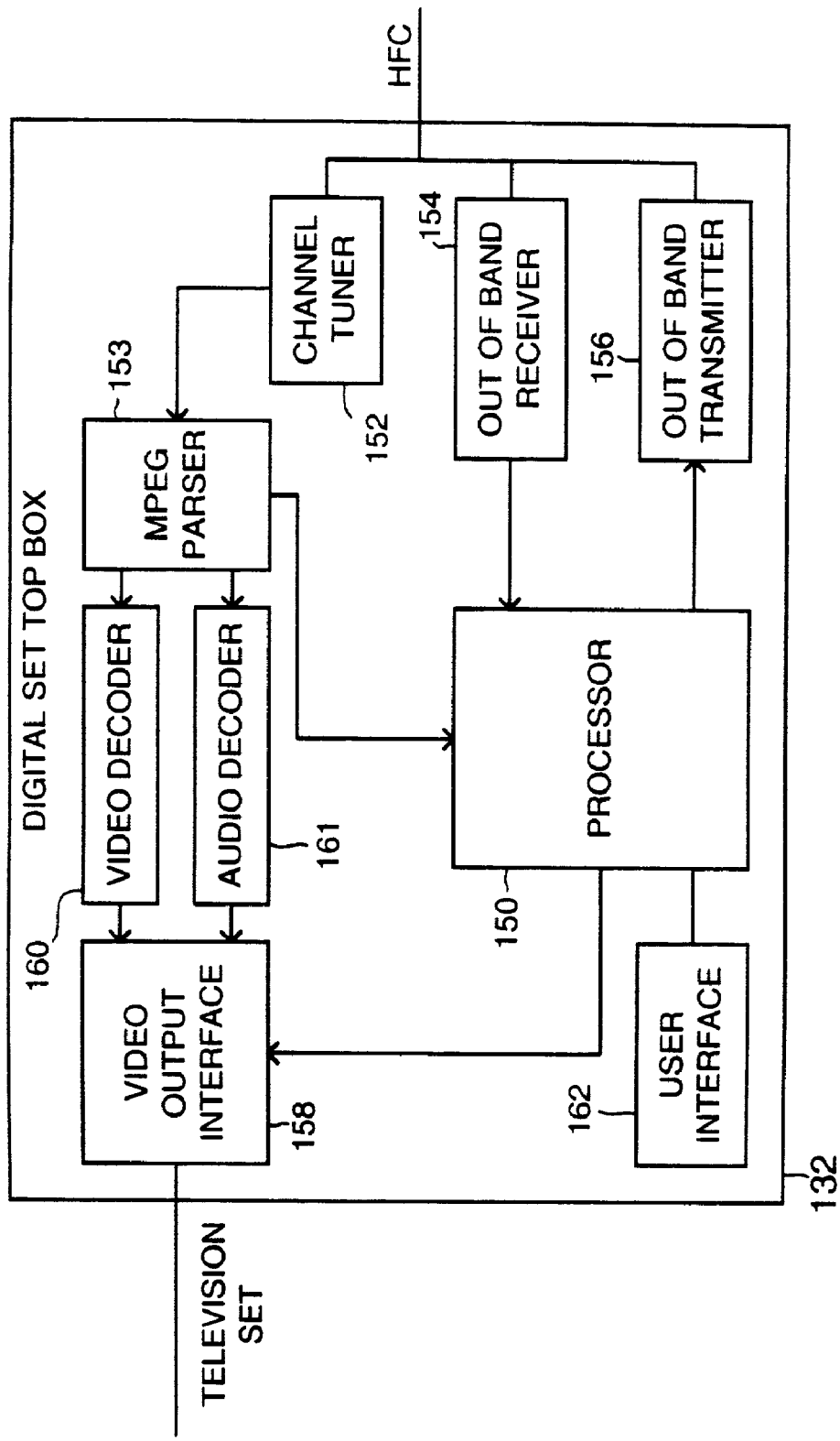
FIG. 1 is an illustration of a set-top-box, operative in accordance with a further preferred embodiment of the present invention.

The invention provides a system and method for broadcasting media packets and application packets to a plurality of end-users, each end-user has a display unit and a control unit for controlling the display unit. The application packets allow for displaying visual objects, for manipulating the visual objects, or for responding to events initiated by the end-users.

The invention provides a method for generating and providing application packets to end-users, each end-user has a display unit and a control unit, the control unit configured to control the display unit, the method including the steps of: (1) Selecting application code portions to be embedded in application packets. (2) Multiplexing the selected application code portions to form at least one application packet group. The control unit of each end-user is configured to process the application packets of an application packet group out of the at least one application packet group, and accordingly (i) display at least a portion of a visual object on the display unit, or (ii) react to events that are related to the display of the at least portion of the visual object on the display unit.

The invention provides a method for executing an application by an endusers, the execution involves displaying visual objects on an end-user display unit and reacting to events initiated by an end-user, the method including the steps of: (1) Receiving a plurality of media packets and application packets. (2) Filtering application packets according to a criterion. (3) Processing the filtered application packets and accordingly displaying a visual object. (4) Responding to events generated by an end-user by adjusting the filter for filtering application packets.

According to an aspect of the invention an application packet group includes application packets allowing for executing an application.

According to an aspect of the invention each application packet is retransmitted, thus allowing for reliability without a need in sending upstream acknowledge signals and the like. The reliability is further enhanced as the application packets are self contained, and each is responsive to only a portion of a visual object, such that losing an application packets influences only a portion of the visual object. The lost application packets can also be replaced by a retransmitted application packet.

According to another aspect of the invention, end-users are arranged in groups, and each group of end-users receives group-associated application packets. Group associated application packets can include at least one application packet group. An application packet group includes application packets that allow for displaying a sequence of logically linked visual objects and optionally for manipulating these visual objects.

According to an aspect of the invention, each application requires that an application packet group be received by an end-user. The application packets allow for displaying a sequence of logically linked visual objects and for selecting between logically linked visual objects in response to events initiated by an end-user. The selection involves filtering the application packets that allow for displaying the selected visual object. The selection is usually made in response to an end-user initiated event. The event can be initiated by pressing a predefined button on a remote control device, and the like. Accordingly, the amount of upstream transmitted information from the end-user is greatly reduced, and many events amount to a selection of retransmitted application packets.

According to yet another aspect of the invention each application packet includes at least one of the following fields: an identification IID field, a display period field, a payload including a bit map of a portion of a visual object, a location field indicative of a location of the portion of the visual object on the display unit, an instruction for determining whether the portion of the visual object is semi-transparent, transparent, overlay, and the like.

According to an aspect of the invention, application packets must be transmitted in a certain manner to be received by the control units of the end-users. Conveniently, monitoring the reception parameters of end-users or just of end-user groups allows for adjusting the transmission parameters to the reception transmitters and improving the efficiency of the application packet transmission. For example, assuming that end-users have set-top-boxes with at least one tuner. Only application packets that are transmitted at a predefined frequency range are received by one of the at least one tuner. If the transmitter is aware of the predefined frequency range it can transmit the application packets at said range. If the transmitter is not aware of the frequency range it must transmit the application packets in a plurality of frequency ranges that can be received by the end-users. In some cases the plurality of frequency ranges can be quite limited. For example, in cases where a set-top-box has two tuners, one dedicated for receiving video and the other for receiving data (including application packets). Usually, the other tuner is tuned to a predefined frequency out of a limited amount of allowable frequency ranges.

According to an aspect of the invention the content of group associated application packets can be responsive to at least one of the following parameters: (a) the identity of media packets provided to the group of end-users, (b) the identity of filtered media packets that are processed and displayed in front of an end-user, (c) profiles of end-users belonging to the group of end-users, each profile reflecting various parameters of the end-user, such as personal information provided by the end-user, end-user's viewing statistics, end-user's application statistics, and the like. For example, an application can be provided to a group of end-users in response to a program that is either provided to the group of end-users or even viewed by at least one of the group members.

According to an aspect of the inventions some applications involve displaying advertisements to end-users.

The invention provides a system and method that require a very thin client at the set-top-box. The very thin client is configured to receive application packets, filter out irrelevant application packets and process the relevant application packets to control a display of visual objects, manipulate the visual objects, and/or respond to events initiated by the end-users. Conveniently, the very thin client is implemented as a stateless machine, as the very thin client does not need to "remember" previous machine states.

According to an aspect of the invention at least some of the media signals and application packets are MPEG compliant. The application packets can be included within data elementary streams.

The invention provides a system that is further adapted to download an interactive software to an end-user control unit, the interactive software allowing the control unit to receive, filter and process application packets.

The invention provides a method for executing an application by end-users, the execution involves displaying visual objects on an end-user display unit and reacting to events initiated by an end-user, the method including the step of: receiving a plurality of media packets and application packets; filtering application packets according to a criterion; processing the filtered application packets and accordingly displaying a visual object; and responding to events generated by an end-user by adjusting the filter for filtering application packets.

According to an aspect of the invention, the method further including a step of responding to only few events that are generated by an end-user by transmitting upstream information. According to an aspect of the invention, the method further includes the steps of filtering media packets, processing the filtered media packets and displaying visual objects accordingly.

According to an aspect of the invention, the received application packets include application packets associated with the filtered media packets.

According to an aspect of the invention, the method further includes a step of responding to events generated by an end-user by transmitting upstream information, only in response to a display of some visual objects out of the sequence of logically linked visual objects.

According to an aspect of the invention, application packets are received via a tuner, and the method includes a step of transmitting upstream information reflecting the status of the tuner.

According to an aspect of the invention the system includes: (a) an application packet generator, for generating application packets, (b) a transmitter, coupled between the application packet generator and a communication medium, for transmitting application packets over the communication medium to a plurality of end-users, the end-users have a set-top-box coupled to a display unit, the very thin client allows for receiving, filtering and processing the application packets to control a display of visual objects, or for manipulating the visual objects, or for responding to events initiated by the end-users. Conveniently, the transmitter further comprises a transmission analyzer for analyzing the transmissions to end-users and determining the transmission characteristics of the application packet. The application packet generator can selectively receive or retrieve application packets that are stored at an application server and generate application packet groups.

The invention provides a system for generating and transmitting an application packet group, the system including: (1) a transmitter, for transmitting an application packet group to at least one end-user. At least some of the at least one end-user have a display unit and a control unit, the control unit is configured to control the display unit; (2) a controller, for selecting application code portions to be embedded in application packets and to provide the transmitted application packet group, the application packet group comprising application packet embedding the selected code portions. The control unit of each end-user is configured to process the application packets and accordingly (i) display at least a portion of a visual object on the display unit, or (ii) react to events that are related to the display of the at least portion of the visual object on the display unit.

The invention provides a set-top-box configured to interact with a broadband media system via a communication medium, the set-top-box including: (a) A tuner, coupled to the communication medium, for receiving application packets and media packets. (b) A filter, coupled to the tuner, for filtering received application packets and media packets, and providing the application packets to a processor. Conveniently, the filter includes an MPEG parser. (c) A processor, coupled to a display unit, configured to process the application packets and accordingly to (i) determine a display of at least a portion of visual objects on the display unit, or (ii) react to events that are related to the display of the at least portions of the visual objects on the display unit, and even to manipulate at least a portion of the visual object.

According to an aspect of the invention, the set-top-box is configured to filter the media packets and to display visual objects in response to events that are initiated by an end-user.

According to an aspect of the invention the set-top-box is further configured to filter application packets allowing for a display of a selected visual object and for responding to events related to the display of the selected visual object. Conveniently, the filter filters application packets in response to events that were previously initiated by an end-user. Preferably, the set-top-box is further adapted to transmit, via an upstream channel, a status of the tuner to a system for providing application packets.

According to an aspect of the invention, the system is configured to provide media packets and application packets to at least one group of end-users, each end-user has a display unit and a control unit for controlling the display unit. The system includes: (a) a router, coupled to the control unit of the end-users, the router operative to receive application packets and media packets, and to provide group-associated application packets and media packets to control units of a group of end-users; (b) a session manager, coupled to the router, the session manager providing routing instructions to said router, for dynamically selecting group-associated application packets and media packets out of the received application packets and media packets. The control unit of each end-user is configured to process the application packets and accordingly either to (I) display at least a portion of a visual object on the display unit, (II) react to events that are related to the display of the at least portion of the visual object on the display unit, or even to (III) manipulate the at least portion of the visual object.

Conveniently, the session manager receives a plurality of session requests, for executing a session through the system, the session manager either allows or denies each said session requests, said session manager provides resource allocation parameters for each said allowed sessions.

The invention provides a broadband multimedia system for allowing an end-user to interact with an application provider. The broadband multimedia system is configured to (a) receive a plurality of media packets and application packets from media sources and application providers, (b) select media packets and application packets to be provided to a plurality of end-users, via a communication medium; (c) provide the selected media packets and application packets to a plurality of end-users. The broadband multimedia router is coupled to end-users via communication medium. The application packets allow for either displaying at least a portion of visual objects on the display unit, or for reacting to events that are related to the display of the at least portions of the visual object on the display unit, and even for manipulating the visual object. An execution of an application involves selecting application packets out of a plurality of application packets broadcast over the communication link.

The invention provides a system that further includes network transmitters for transmitting to each group of end-users group-associated application packets over a bandwidth limited media.

The invention provides a system that further includes a dynamic network restructuring unit, coupled to the network transmitters, for providing channel managing commands to each said network transmitters, receiving group-associated application packets from said router.

The invention provides a system that further includes a plurality of shared area managers, each shared area manager being associated with a single group of end-users, each shared area manager is operative to select group-associated application packets to be provided to the associated group of end-users.

According to a further aspect of the invention the system further includes at least one media degradation unit, for compressing media signals.

According to another aspect of the invention some of the application packets and some of the media packets are non-addressable packets, wherein some media packets are addressable packets, wherein the router including: (a) a plurality of input ports, including at least one non-addressable stream input port; (b) a plurality of non-addressable stream output ports; (c) a multiple port switch, connected between said non-addressable stream input ports and said non-addressable stream output ports. The multiple port switch directing non-addressable application packets and media packets, received from a selected one of said at least one non-addressable stream input ports, to at least a selected one of said at least one non-addressable stream output ports. The multiple port switch selecting said selected non-addressable stream output port according to the type and identity of said selected non-addressable stream input port and the identity information embedded in said non-addressable application packet.

According to yet another aspect of the invention the system further includes at least one addressable stream communication port, connected to said multiple port switch, said multiple port switch directing an addressable media packet, received from a selected one of said at least one addressable stream communication ports, to at least a selected one of said at least one non-addressable stream output ports. Conveniently, the selected non-addressable stream output port encapsulates an addressable media packet in a non-addressable stream packet, when the addressable packet is received from one of said at least one addressable stream input ports. Preferably, MPEG transport packets are encapsulated into communication packets respective of the communication protocol of said multiple port switch.

According to yet another aspect of the invention the at least one non-addressable stream input port includes a multiple program transport interface and wherein said at least one non-addressable stream output port includes a multiple program transport interface.

According to yet another aspect of the invention the system further includes a plurality of stream processors, each said stream processor being connected between said multiple port switch and a respective one of said non-addressable stream output ports.

The disclosed technique is directed to a broadband network, which can be either wired or wireless, such as an HFC network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

DOCSIS is a data over cable transmission specification. CMTS denotes cable modem termination system, which is conventionally used for DOCSIS. MPEG denotes a family of media (especially video and audio) decoding and multiplexing specifications where ISO/IEC 11172 is also called MPEG-1 and the ISO/IEC 13818 is also called MPEG-2.

For convenience of explanation it is assumed that the media packets and application packets are received and handled by a Broadband Multimedia System (BMS). The BMS receives or retrieves application packets from an application provider and partially acts as a an application packet generator by selectively receive or retrieve application packets that are stored at an application server and generate application packet groups. The BMS also acts as a transmitter and an analyzer. The BMS is coupled between the application provider and a communication medium, for transmitting application packets over the communication medium to a plurality of end-users, the end-users have a set-top-box coupled to a display unit, the very thin client allows for receiving, filtering and processing the application packets to control a display of visual objects, or for manipulating the visual objects, or for responding to events initiated by the end-users. Conveniently, the BMS further comprises a transmission analyzer, such as dynamic network reconstructing unit or shared area managers, for analyzing the transmissions to end-users and determining the transmission characteristics of the application packet. It is noted that the generation of application packets groups, group associated application packets, the transmission of application packets groups and group associated application packets can be done by other combination of software and hardware. For example, application packets groups can be multiplexed with media packets by a various statistical multiplexers, such as prior art statistical multiplexers. An RF transmitter can transmit the application packets in frequencies that are either predefined, or generated in response to the spectrum of multiplexed signals that are provided, over a broadband network such as a HFC network, to end-users.

For convenience of explanation it is assumed that both digital services and analog services, such as digital television and analog television channels can be switched across the same local paths of each Broadband Multimedia Systems (BMS). It is noted that for the purpose of the invention analog and digital services can be conveyed over distinct paths. For example, while digital service signals are down converted and passed across a packet switching router, such as router 116, analog service signals can remain in a high frequency form, such as RF form, to be later combined with up-converted digital service signal that are outputted the router.

The scope of the invention is not limited to single tuner set-top-boxes, and can be applied to set-top-boxes that have more than a single tuner. For convenience of explanation only, FIG. 1 and the following figures refer to a single tuner set-top-box.

Reference is further made to FIG. 1, which is a schematic illustration of a single tuner digital set-top-box, generally referenced STB 132. STB 132 includes a channel tuner 152, an MPEG parser 153, an Out-Of-Band receiver 154, an Out-Of-Band transmitter 156, a user interface 162, a processor 150, a video decoder 160, audio decoder 161, a storage unit (not shown) and a video output interface 158. MPEG parser 153, Out-Of-Band receiver 154, Out-Of-Band transmitter 156, user interface 162, video output interface 158 and the storage unit, are connected to processor 150. Video decoder 160 and audio decoder 161 are connected to MPEG parser 153 and to video output interface 158. Channel tuner 152, Out-Of-Band receiver 154 and Out-Of-Band transmitter 156 are further connected to the HFC. Channel tuner 152 is further connected to MPEG parser 153. Video output interface 158 is further connected to multimedia output unit such as a television set and may further be connected to an audio system (not shown).

Digital STB 132 receives elementary video, audio and data streams on MPEG transport in In-Band channels, via channel tuner 152. Channel tuner tunes into the selected In-Band channel and provides the signal thereof to MPEG parser 153. MPEG parser 153 distributes the elementary streams received in the channel between processor 150, video decoder 160 and audio decoder 161. It is noted that MPEG parser 153 distributes only elementary streams, which belong to a specific program number. MPEG parser 153 provides application packets to processor. The application packets have a unique PID identifier.

Video decoder 160 decodes the video elementary stream provided thereto and produces video output, to be provided to a television set via video output interface 158. Audio decoder 161 decodes the audio elementary stream provided thereto and produces audio output, to be provided either to a television set or to an audio system, via video output interface 158.

STB 132 and especially processor 150 are controlled by an operating system and at least one lower level software code. One of the lower level software code, referenced interactive code (ITC), allows for processing control and/or display code portions embedded within application packets and accordingly display visual objects on a television display, manipulate the visual objects and react to events that are related to the visual objects. ITC is usually downloaded to STB 132 through a downstream channel and then installed on it.

According to an aspect of the invention, control and/or display code are embedded in MPEG transport packets, referred to as application packets. All application packets include a unique PID that identifies them as being application packets. Each application packet has a unique IID that differentiates it from other application packets. An IID can also be used to identify all application packets that are related to a single visual object. Application packets are received at channel tuner 152 and forwarded to MPEG parser 153. MPEG parser identified the unique PID and sends the received application packet to processor 150, either directly of via a storage unit. ITC recognized that application packet were provided to processor 150, filters the application packets in view of their IID, such that only display and control codes relating to a selected visual object are executed by processor 150. In response, processes 150 produces visual and audible signals. Processor 150 provides these video and audio signal to video output interface 158, which in turn provides them to the television set connected thereto. It is noted that the visual signal produced from the received data can be combined on screen with the video decoded from the video elementary stream.

The ITC is relatively "thin", as it only needs to filter/select relevant application packets, to provide video output interface 158 with display instructions that are embedded within the selected application packets, and to interpret incoming signals from user interface 162 to events. Set-top-box 132 is not aware of logical connections between application packets of distinct visual object, and usually merely changes its filter in view of detected events, to select application packets.

According to an aspect of the invention the display code is in a form of a bitmap, that enables processor 150 to process it and provide it as an overlay object on top of the video object, via video output interface 158. The overlay can also be made semi transparent where portions of the background object are partially seen through the overlaid object.

According to another aspect of the invention the display code within an application packet is responsive for displaying a predefined segment of the visual object. Each application packet is self-contained. Said in a different manner, a content of an application packet does not depend upon the content of another application packet. If an application packet is "lost" then only a fragment of the visual object is missing. Partitioning a single visual object to a large number of application packets assures that the loss of a single application packet does not result in severe visual quality degradation.

Figure 11:
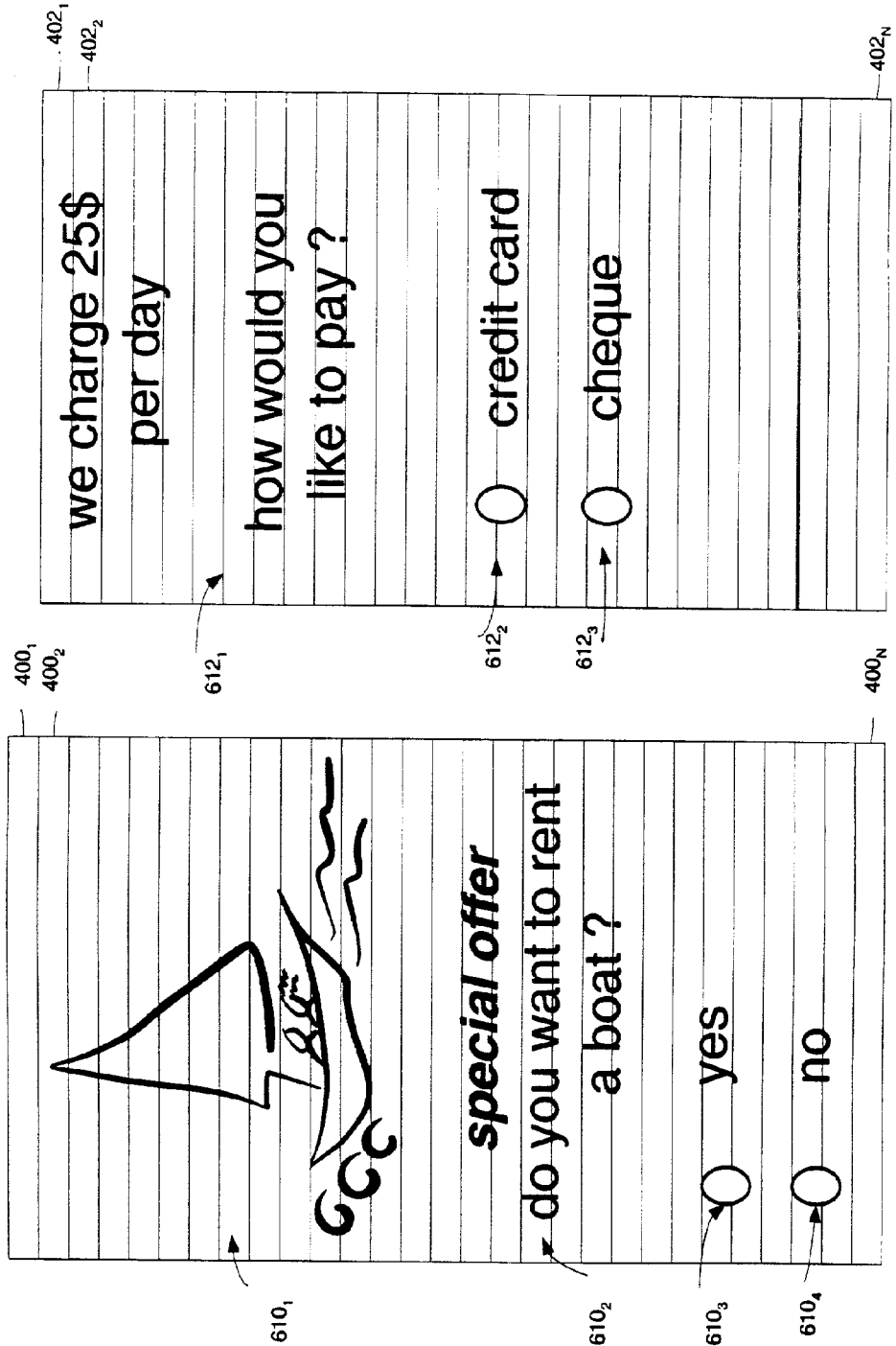
FIG. 11 illustrates visual objects represented by a plurality of application packets, operative in accordance with further preferred embodiments of the present invention.

Referring to FIG. 11, illustrating a plurality of application packets $400_1$–$400_N$ containing display and control code that enable the display of a visual object of a sail boat $610_1$, and visual objects such as text "special offer do you want to rent a boat", "yes" "no" generally referenced $610_2$, and two "hot keys" $610_3$ and $610_4$. The control code portion of the control and display code embedded within application packet $400_1$–$400_N$ allows a television viewer to select one of the two "hot keys" in response to a signal generated by a remote control unit and received at user interface 162. The segmented visual object and text illustrate that each application packet out of application packets $400_1$–$400_N$ includes display code that is responsible for the appearance of a segment of the visual object. It is further noted that not each application packet has both display code and control code, as some can include only a single type of code.

Figure 13:
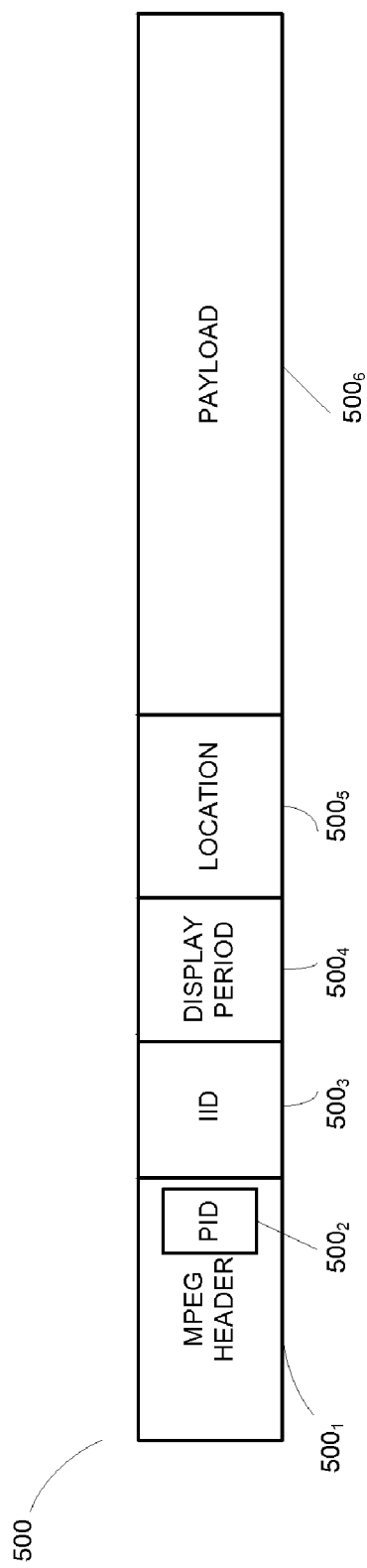
FIG. 13 illustrates an application packet, in accordance with a preferred embodiment of the invention.

Referring to FIG. 13, illustrating application packet 500, according to a preferred embodiment of the invention. Application packet 500 has an MPEG transport header $500_1$, the header includes a PID field $500_2$. The value of the PID filed indicates that the MPEG transport packet is an application packet. Application packet 500 further includes a unique IID field $500_3$, and additional display and control fields, such as display period field $500_4$, location field $500_5$ and payload $500_6$. Location field can be used to indicate a location on the television screen of the visual content included within payload $500_6$. Application packet 500 can include additional fields such as a PTS field indicative of a time in which the visual content of 500 should be presented/displayed. Payload $506_6$ can include control code that determines which application packets are filtered and provided to processor 150 and which are discarded. Application packet 500 can include additional information and control fields such as a type of display field indicating if the visual object is overlay, transparent or semi-transparent and the like.

It is noted that in an STB that has two tuners, the display can be also provided as a picture in picture. In such a case a first tuner is tuned to receive and display the video signals while the second tuner is tuned to receive video signals including the interactive related display.

User interface 162 receives commands from a user and provides them to processor 150. Processor 150 analyzes the user commands and may transmit data in the upstream direction using Out-Of-Band transmitter 156.

STB 132 can receive narrow cast data that is submitted In-Band, as illustrated at U.S. patent application Ser. No. 09/595,624 filed at Jun. 16, 2000 of Oz et al, which is incorporated in its entirely by reference.

Figure 2A:
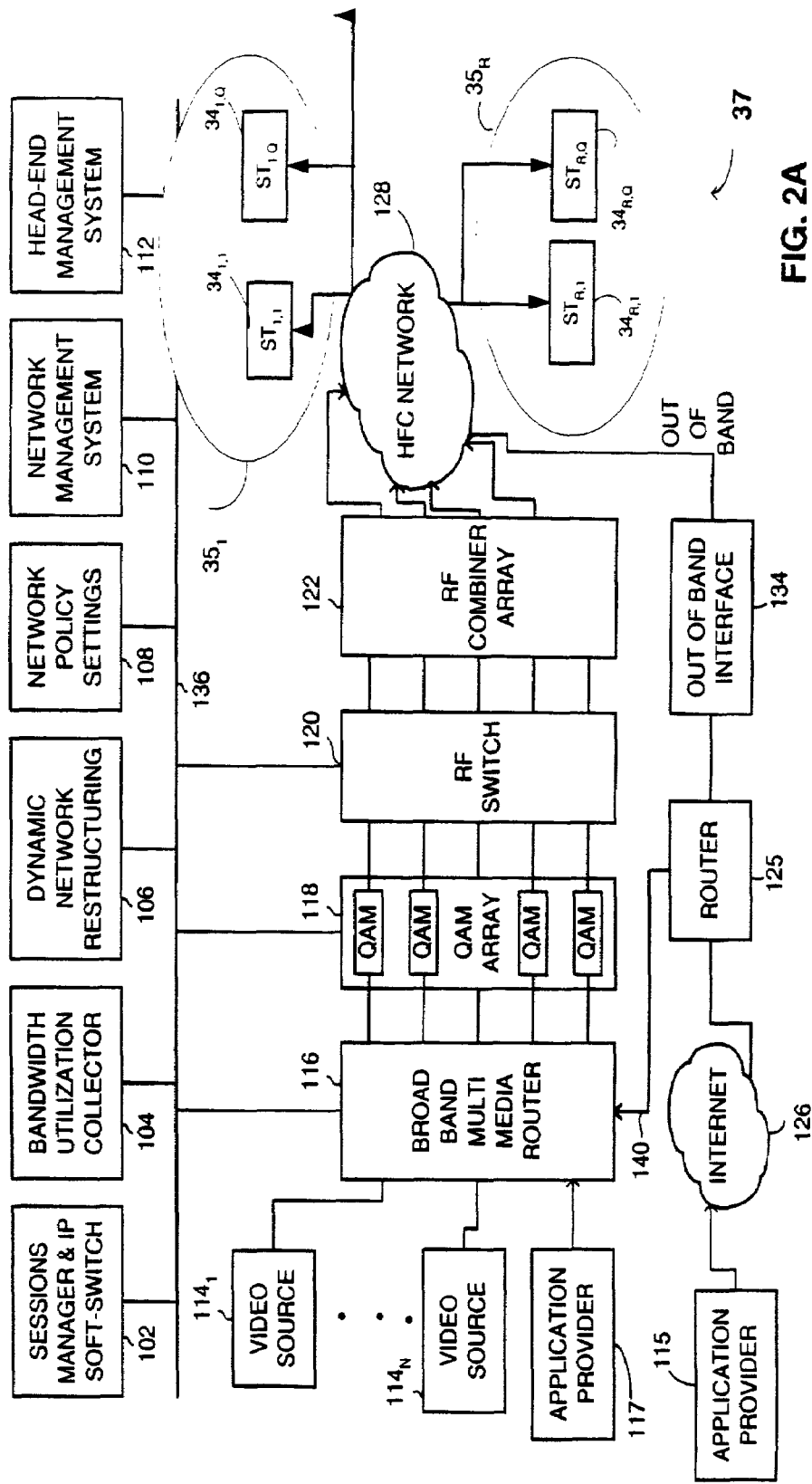
FIGS. 2A and 2B are schematic illustrations of a Broadband Multimedia System, constructed and operative in accordance with preferred embodiments of the present invention.
Figure 2B:
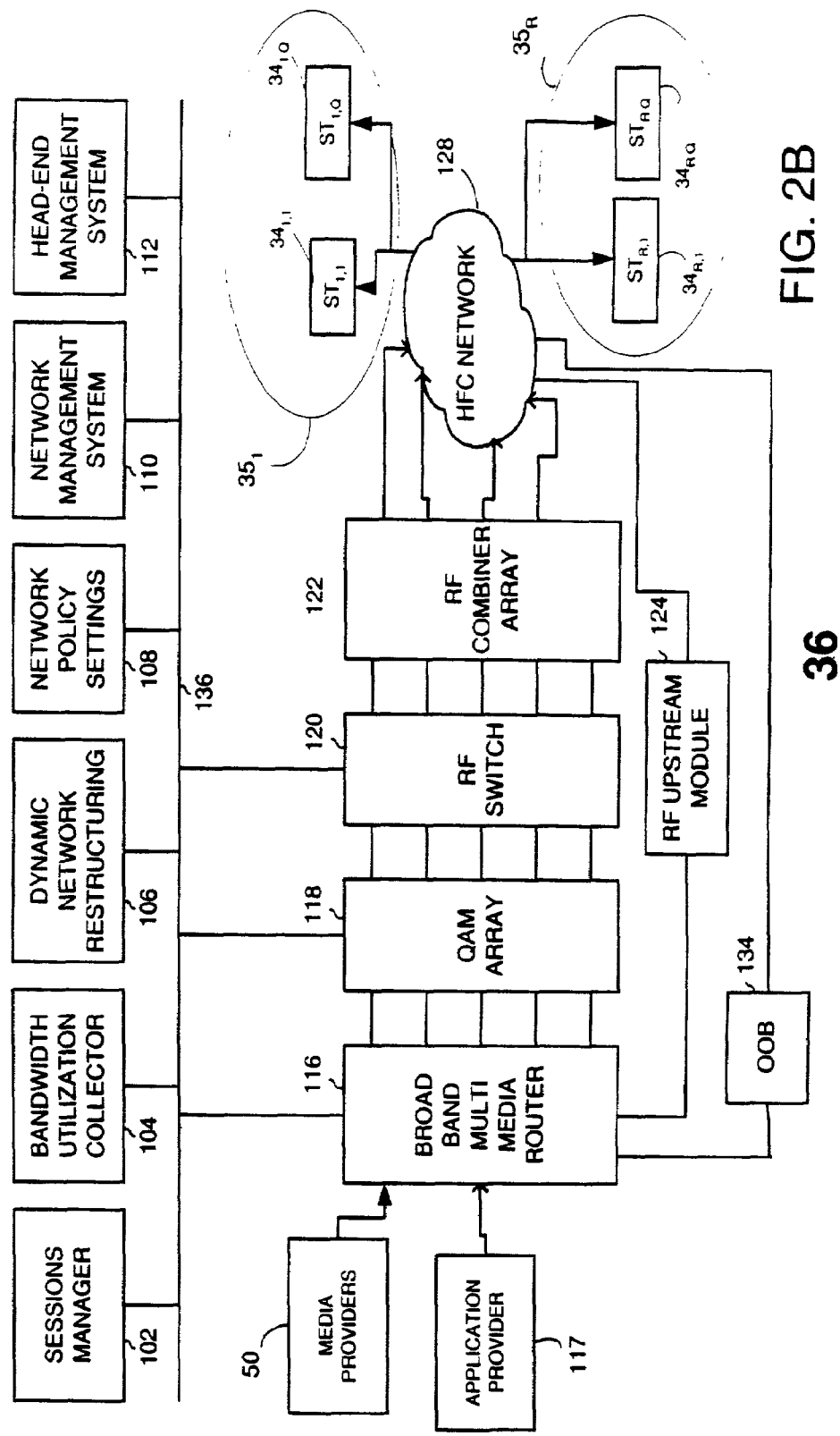

Reference is now made to FIGS. 2A and 2B, which are schematic illustrations of BMS 37 and 36, accordingly, constructed and operative in accordance with preferred embodiments of the present invention.

BMS 37 of FIG. 2A is analogous to BMS 36 of FIG. 2B but has an additional router 125, it is further coupled to internet 126 and to an additional application server 115. Router 125 is coupled via link 140 to broadband multimedia router 116 for allowing set-top-boxes to interact with internet 126 and additional application server 115. Application providers such as application servers 115 and 117, are configured to provide control and display code, embedded within a plurality of application packet. Router 125 can also be utilized to download ITC from internet 126.

BMS 36 includes a logical communication bus 136, a session manager unit 102, a bandwidth utilization collector 104, a dynamic network restructuring unit 106, a network policy settings unit 108, a network management system 110, a broadband multimedia router 116, a QAM array 118, an RF switch 120, an RF upstream module 124, an RF combiner array 122, an Out-Of-Band unit 134, and a management system 112. BMS 36 is coupled to a plurality of set-top-boxes $34_{1,1}$–$34_{R,Q}$ via Hybrid Fiber Coax (HFC) network 128. The set-top-boxes are grouped in service groups $35_1$–$35_R$, whereas members of the same service group receive the same In band signal. Set-top-box $34_{R,Q}$ is the Q'th member of the R'th service group.

Broadband multimedia router 116 is coupled to logical communication bus 136, RF upstream module 124, QAM array 118, to at least one application provider, such as application server 115, to media providers such as VOD servers 252, music on demand unit 254, interactive MPEG unit 256, Internet television 258, telephony gateway 262, and the like.

Session manager unit 102, bandwidth utilization collector 104, dynamic network restructuring unit 106, network policy settings unit 108, network management system 110, and management system 112 are further connected to the logical communication bus 136.

RF switch 120 is connected to logical communication bus 136, QAM array 118 and to RF combiner array 122. RF upstream module 124 is connected to broadband multimedia router 116, and to the plurality of set-top-boxes via the HFC network. RF combiner array 122 is further connected to Out-Of-Band unit 134 and to a plurality of set-top-boxes.

Session manager unit 102 receives and approves session requests, processes them and provides routing parameters to the broadband multimedia router 116. During at least some of the sessions, multiple application packets are broadcast to a plurality of set-top-boxes. According to an aspect of the invention each service group receives a plurality of application packets that are related to the content of the programs either provided or being watched by the members of the service group. The provision of application packets that are related to the programs being viewed by the members of the service group requires each set-top-box to send an upstream signal, via out of band interface 134, indicating the currently viewed program. BMS 36 receives the signals and in response updates a service group database indicative of the programs that are viewed by the members of the service group.

Broadband multimedia router 116 receives media streams from video sources $114_1$–$114_N$ of FIGS. 2A and 2B. The media streams can include video streams, audio streams, data streams, individual data packets and the like. Such streams can be received over video channels, such as ones operative according to MPEG transport interfaces, or over data channels, such as TCP/IP Ethernet communication lines. Some of said media sources can be Video On Demand (VOD) server 252, music on demand server 254, interactive MPEG 256, internet television 258, internet access 260 and local telephony gateway 262 of FIG. 7.

Broadband multimedia router 116 also receives application packets from application server 117. According to an aspect of the invention, some applications are associated with a certain media stream, such as a program. For example, a set of various visual objects must be displayed to the viewers of a specific program. BMS 36 is able to transmit application packets to the viewers of the specific channel by tracking the resources that are allocated for the transmission of the specific program and allocating compatible resources for the transmission of the display and control data. For example, assuming that a set-top-box has a single 6-Mhz wide tuner. If the specific channel is transmitted within a known window of 6-Mhz, then the display and control code have to be carried by a carrier signal within the known window.

According to an aspect of the invention, an application packet group is sequentially broadcast to each service group. Each group includes application packets that embed control and display code related to a program out of the plurality of programs either provided or viewed by the members of the service group. The sequential transmission provides robustness, as each application packet is retransmitted to the members of a service group. Conveniently, each application packet groups includes control and display code for allowing the display of a sequence of associated visual objects. The sequence may include visual objects that are displayed in response to events related to other visual objects of the sequence. For example, an exemplary sequence includes application packet $400_1$–$400_N$ and $402_1$–$402_N$, whereas the display of the visual object within application packet can cause a viewer to select "hot key" $610_3$, and in response to display the object embedded within $402_1$–$402_N$. Each visual object has a unique object ID (IID). The IID is embedded within each application packet that is related to an object. The IID allows for filtering application packets of a relevant visual object, while discarding other application packet.

Figure 12:
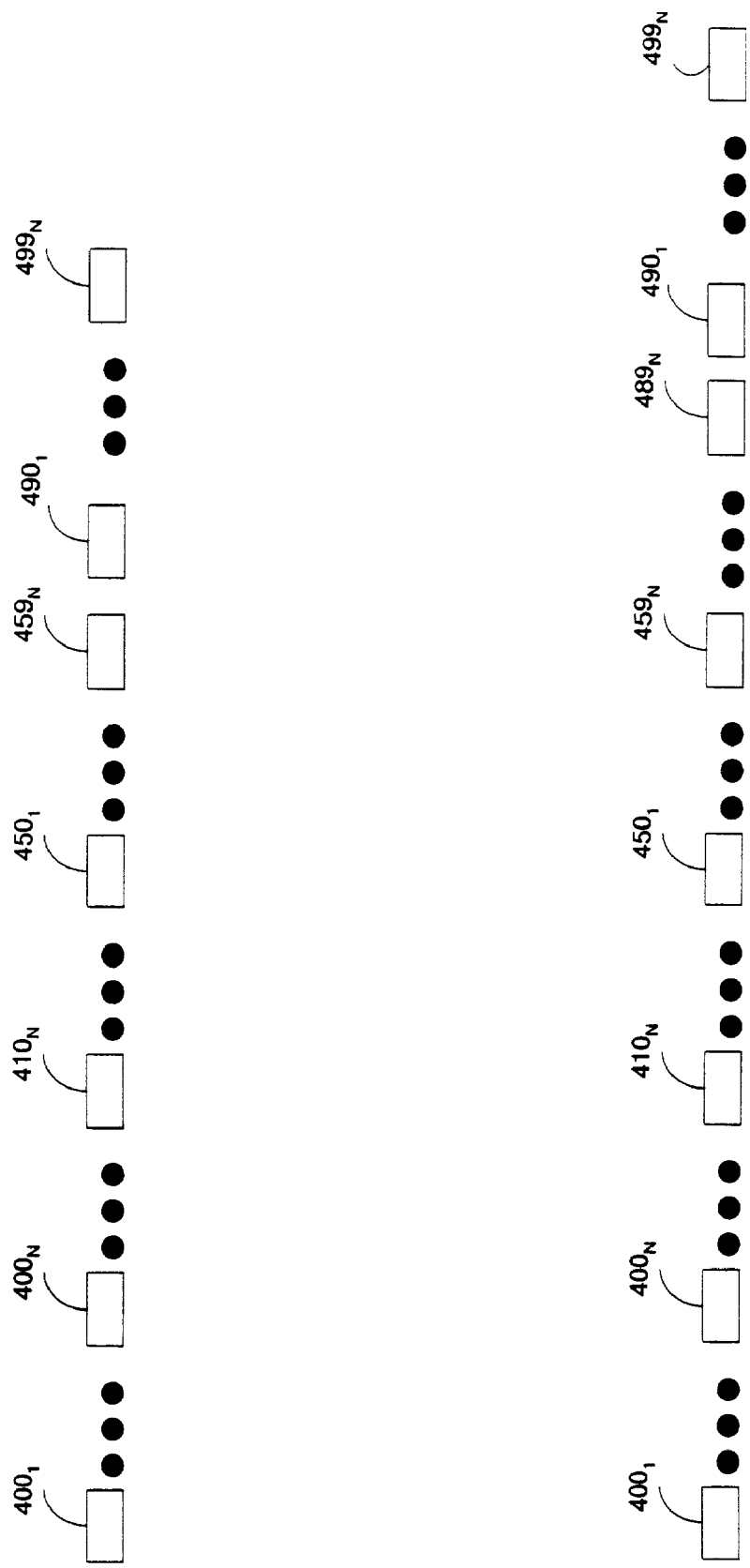
FIG. 12 illustrates a content of a portions of exemplary application packet groups, in accordance with a preferred embodiment of the invention.

Referring to FIG. 12 illustrating some application packets of an application packet group, according to a preferred embodiment of the invention.

It is assumed, for convenience of explanation, that (i) the application packet groups is sent to service group $35_r$, including set-top-boxes $34_{r,1}$–$34_{r,Q}$, (ii) the members of service group $35_r$ receive programs $PR_1$–$PR_M$ and that they view a subset of said programs including $PR_1$–$PR_J$, J<M, (iii) some of the application packets are associated with programs either provided to set-top-boxes or viewed by set-top-boxes users.

It is noted that a content of an application packet group can be further influenced by additional parameters, such as end-users viewing statistics, end-users profile and the like.

Each application requires a set of visual objects to be displayed at a television set. As a viewer is required to select between various options, the set includes all the possible visual objects that can be displayed in response to any selection of the user. For example, if a viewer selects hot key $612_2$ then ITC will display a first visual object while if the user selected hot key $612_3$, another visual object will be displayed.

The execution of a first application requires that the group includes application packets $400_1$–$400_N$, $402_1$–$402_N$ . . . $409_1$–$409_N$. The first application is related to $PR_1$. Stated another way, the first application should be executed only by set-top-boxes that are coupled to television sets that display $PR_1$. The execution of a second application requires that the group includes application packets $410_1$–$410_N$, $412_1$–$412_N$ . . . $419_1$–$419_N$. The execution of a J'th application requires that the group includes application packets $450_1$–$450_N$, $452_1$–$452_N$ . . . $459_1$–$459_N$. The J'th application is related to $PR_J$. The execution of an M'th application requires that the group includes application packets $480_1$–$480_N$, $482_1$–$482_N$ . . . $489_1$–$489_N$. The M'th application is related to $PR_N$. The execution of an (M+1)'th application requires that the group includes application packets $490_1$–$490_N$, $492_1$–$492_N$ . . . $499_1$–$499_N$. The (M+1)'th application is not related to a single program and has to be displayed to all users of all the set-top-boxes.

Referring to the upper part of FIG. 12, illustrating the content of the group in a case where BMS 36 tracks which programs are viewed by the members of a service group and provides only the relevant application packet.

The application packet group includes application packets $400_1$–$459_N$, related to $PR_1$–$PR_J$ and application packets $490_1$–$499_N$. These application packets are time division multiplexed. It is noted that BMS 36 can also include additional application packets that are related to other programs out of $PR_{J+1}$–$PR_M$ so that if a user selects to view a program out of $PR_{J+1}$–$PR_M$, there is still a chance that he can immediately receive the relevant application packets, without changing the content of the group.

Referring to the lower part of FIG. 12, illustrating the content of the group in a case where BMS 36 tracks which programs are provided, (and not necessarily are viewed) to the members of a service group and provides only the relevant application packet. Accordingly the group includes application packets $400_1$–$489_N$, related to $PR_1$–$PR_M$ and application packets $490_1$–$499_N$. These application packets are time division multiplexed. FIG. 12 only illustrates an exemplary time division multiplex scheme in which the application packets of a single visual object are sequentially transmitted.

According to an aspect of the invention, an input received from a user in response to a display of a visual object (an event) is used to determine the IID of the next visual object to be displayed. As in many cases the selected visual object is included in the group of transmitted application packets so that the selection does not require the set-top-box to transmit any data via upstream channels, thus decreasing the upstream channel load. The selection merely changes the filtering of application packets by the set-top-box.

According to an aspect of the invention the ITC includes a mapping between programs and IID of some visual objects. When an end-user selects to view a program, the appropriate application packets are processed to initialize a related application. The stored IID is the IID of a first visual object out of a sequence of visual objects to be displayed when a corresponding program is displayed on the television set connected to the set-top-box. Accordingly, when a set-top-box user changes a viewed upon program there is a need to update BMS 36 only if application packets associated with the program are not already included within the broad-casted group.

In order to receive an application packet, STB 132 has to be tuned to a frequency window that includes the carrier frequency of the application packet. Set-top-boxes having more than a single tuner can be configured to receive the application packet and additional data on a predefined frequency. The predefined channel does not necessarily relate to the frequency of a received program. In such a case application packet can be carried over carrier waves having that predefined frequency. Set-top-boxes that have a single tuner have to receive the relevant applications packet with their single tuner. According to an aspect of the invention, BMS 36 tracks the programs that are being viewed by the members of a service group and adjusts the carrier frequency of application packet that are intended to be received by the members of the service group.

The adjustment can require changing the resources allocation of BMS 36. According to an aspect of the invention application packets are transmitted both at various frequencies, some corresponding to the programs that are currently viewed by the members of a service group, whereas some frequencies correspond to other programs, referred to as auxiliary frequencies. If a viewer asked to be tuned to a program that is transmitted over one of the auxiliary frequencies, there is no need to change the resource allocation of BMS 36.

A reallocation of BMS's 36 resources can be handled by session manager 102, dynamic network reconstructing 106 and other units within BMS 36. Tracking the viewed programs allows for decreasing the resources (carrier frequencies) required to allow the provision and reception of application packets by set-top-boxes. If BMS 36 does not track the viewing patterns, more carrier frequencies will be required to carry the application packets such that relevant application packets can be received by the set-top-boxes. Tracking the frequency window of a set-top-box requires only minimal transmission of information over the upstream channel. When a viewer changes a program a short message is sent upstream.

The routing parameters produced by session manager 102, specify input and output routing commands for broadband multimedia router 116, to operate there according. It is noted that a conventional MPEG transport stream does not include routing information such as destination or origin, rather just limited identification information, known as PID (Packet Identification) The disclosed technique overcomes this disadvantage as will be described in detail in conjunction with FIG. 7. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager 102 receives session initialization requests from a variety of media sources, such as application servers, end-users, and additional modules. The session manager 102, determines if these requests are compatible with each of a plurality of policy types and available resources, and determines whether or not to approve or deny these requests. According to a preferred embodiment of the invention, one type of session request indicates that a member of a service group requests to view a television channel.

The session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end-users, at predetermined hours of the day. A further example for a network policy can include a condition where a selected source can only provide services to selected users, and not to others, and the like. The session manager further accesses network management system 110, for determining if there are malfunctions in selected parts of the network. According to a preferred embodiment of the invention, a network policy defines a group of digital and analog television channels that can potentially be provided to the members of the s'th set of service groups coupled to BMS 36. The content of the group can be dynamically configured, in view of the behavior patterns, and/or requests of the members.

QAM array 118 includes a plurality of QAM units (not shown), each receiving DVB/ASI media information and transmitting it modulated over an RF channel, connected thereto.

RF combiner array 122 includes a plurality of RF combiners (not shown), each operative to receive a plurality of RF channels and produce a single, multiband RF signal, therefrom. The amount of QAM units usually is much larger than the amount of RF combiners. The RF switch 120 is operative to route RF channels from each port therein, to each other port therein. Hence, RF switch 120 can connect each QAM of QAM array 118 to each RF combiner of RF combiner array 122, and thus, dynamically control network RF resources. Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to members of a service group via HFC network communication link. This direction is called downstream. Members can include DOCSIS compatible cable unit, non-DOCSIS compatible cable units, cable units that have different paths for video signals and for data signals, cable units that have a single path, and the like.

According to the present invention, end-user equipment is also capable of transmitting data. This direction is called upstream. RF upstream module 124 receives signals from the end-user equipment, and performs down-conversion and demodulation thereof. RF upstream module 124 can further include an RF switching mechanism, which optimizes the usage of the upstream direction, and hence can further enhance the operation of BMS 36. The Out-Of-Band (OOB)

module 134 communicates with each of the targets of that upstream information in the Head-end, thus providing a reverse channel from HFC network 128 to Head-end. The transmitted data can include television channel request. According to another aspect of the invention OOB module 134 is also used from transmitting downstream information.

Figure 14:
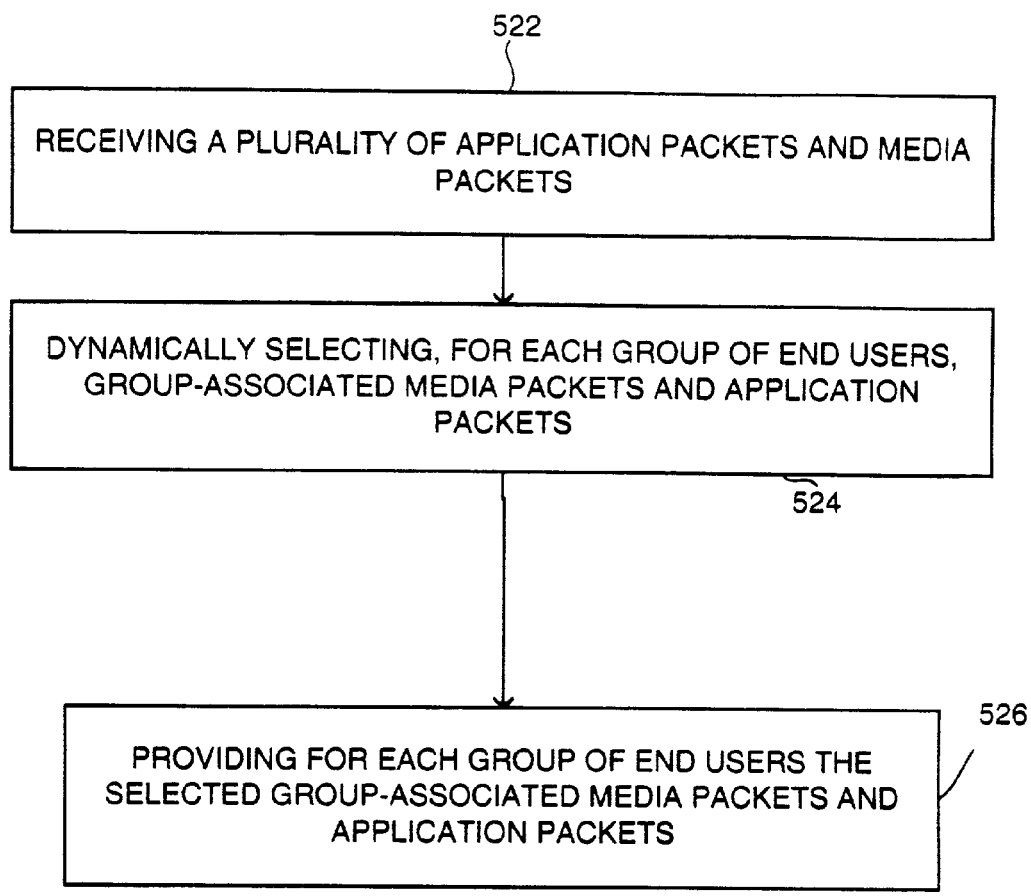
FIG. 14 is a flow chart illustrating a method for providing application packets to at least one group of end-users, in accordance with a preferred embodiment of the invention.

Reference is now made to FIG. 14, illustrating method 520 for providing application packets to at least one group of end-users.

Method 520 starts by step 522 of receiving application packets and media packets. Referring to the example set forth at FIG. 2A, BMS 36 receives a plurality of media packets from video sources such as $114_1$–$114_N$ and receives application packets, or information to be converted to application packets, from application server 117.

Step 522 is followed by step 524 of dynamically selecting, for each group of end-users, group-associated media packets and application packets. Referring to the example set forth at FIG. 2A, BMS 36 is coupled to a plurality of service groups $35_1$–$35_R$ via HFC network 128. BMS 36 is configured to provide to each group of end-users a distinct multiplexed signal. The content of the multiplexed signal is determined by sessions that are controlled by session manager 102. The multiplexed signal can include application packets that are selected to be provided to groups of end uses in response to a predetermined criterion. Some of the application packets can be associated with the content of media packets either provided to a group of end-users or even to the content of media signals that are processed and displayed by the end-users. The criterion can reflect a relationship between an application and a transmitted program, an application priority and the like.

Step 524 is followed by step 526 of providing to each group of end-users, out of the at least one group of end-users, the corresponding group-associated media packets and application packets. Conveniently, the step of selecting is preceded by a step of allocating the broadband multimedia system resources for providing the group associated application packets.

Figure 3:
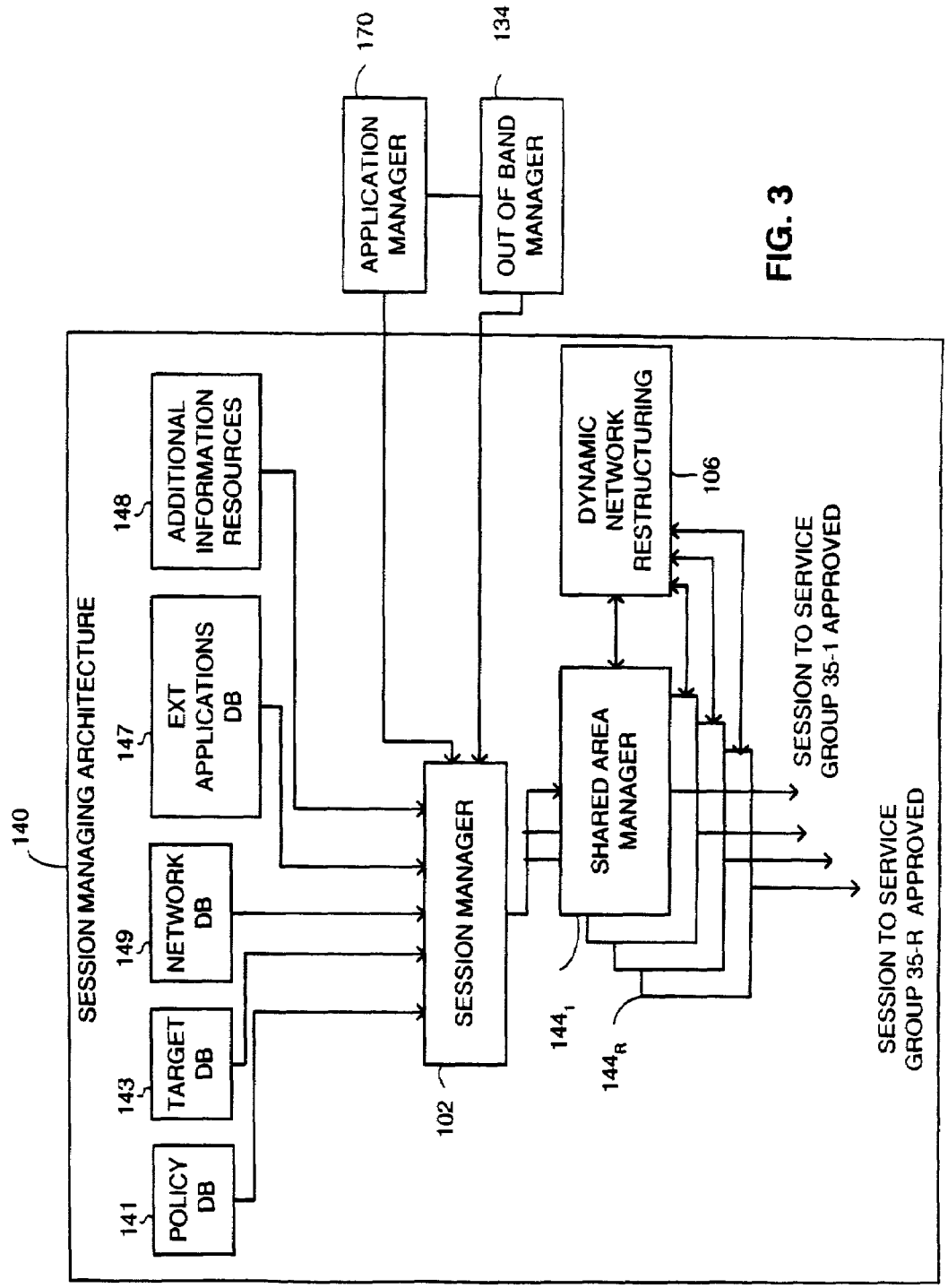
FIG. 3 is a detailed schematic illustration of a session managing architecture, constructed and operative in accordance with another preferred embodiments of the present invention.

Reference is now made to FIG. 3, which is a detailed schematic illustration of session managing architecture 140, constructed and operative in accordance with another preferred embodiment of the present invention. Session managing architecture 140 is described in conjunction with BMS 36 of FIG. 2.

Architecture 140 includes session manager 102, R shared area managers $144_r$, r ranges between 1 to R, a policy database 141, a target database 143, a network database 145, an external applications database 157, and an additional information resources 148. Architecture 140 further includes a Dynamic Network Restructuring Manager (DNR) 106, an application manager 170, and an Out-Of-Band manager 134.

Policy database 141 is a general policy database which includes a plurality of policy records specifying rules, such as what kind of information can be transmitted in the system, from which sources, to which targets, at what time, and the like.

Target database 143 includes a plurality of target records. A target record can include information related to policies related to the target, network topological location of the target, and the like.

Network database 145 includes a plurality of network policy records. A network policy can include restrictions regarding overall usage of the network, such as a predetermined minimal transmission quality level for selected portions of the network, scheduling schemes for allocating selected portions of the network for specific services, and the like.

External applications database 157 includes a plurality of external application records specifying data on these applications, such as what is allowed or forbidden for these applications, and how are these applications connected to the system.

Each shared area manager $144_r$ manages the bandwidth utilization for the members of the r'th service group, using end point equipment, which can include DOCSIS cable units, non-DOCSIS cable units, digital television sets, and the like. It assigns the optimal channel to the session. According to a preferred embodiment of the invention each shared area manager monitors services, such as television channels and the like that are provided to the members of associated service group and can determine whether a requested service is already provided to the member, and whether the requested service can be provided to a member of the service group.

Architecture 140 can be configured to track the viewing patterns of the corresponding service group members and accordingly to determine which application packet to transmit, the RF channels that are used to convey application packet and the like.

Session manager 102 is connected to a plurality of shared area managers $144_1$–$144_r$, policy database 141, target database 143, network database 145, external applications database 157, additional information resources 148, application manager 170, and Out-Of-Band manager 134. Application manager 170 is further connected to Out-Of-Band manager 134. Shared area manager 144 is further connected to DNR manager 106.

As stated above, session manager 102 is operative to approve or deny session initialization requests to BMS 36. Session manager 102 receives an init-session request either from the application manager 170, or from the Out-Of-Band manager 134.

A session request, for providing display and control code can be generated by application server 117, but can also be generated in response to a the transmission of media streams to a plurality of set-top-boxes. In accordance with another aspect of the invention a session can be initiated by a set-top-box, via Out-Of-Band manager 134, such as a first set-top-box that started to view a specific program.

Session manager 102 determines if the requested session can be approved according to a plurality of parameters such as network policies, target policies, general policies, application manager policies, additional information resources, and the like. It is noted that at this stage the session is not approved yet. The session manager accesses other modules such as the shared area manager 144 and the like, receives their "approval" and only then, approves the session and provides an initiation command to application server 180.

After the session manager 102 approves the session, it accesses the shared area manager 144, which attempts to allocate a suitable channel therefor. If the shared area manager 144 fails to allocate such a channel, then the session manager proceeds to the DNR manager 106. Otherwise, the session manager 102 approves the session.

The DNR manager 106 performs channel and frequency switching (in hardware), and dynamically changes the amount of channels, which are dedicated to each group of nodes, according to the bandwidth usage across groups of nodes. This allocation can be dynamic as long as the total number of dedicated channels does not exceed the maximum frequency band that is physically achievable within any specific group of nodes. If allocation fails, then the session manager 102 denies the session.

Figure 4:
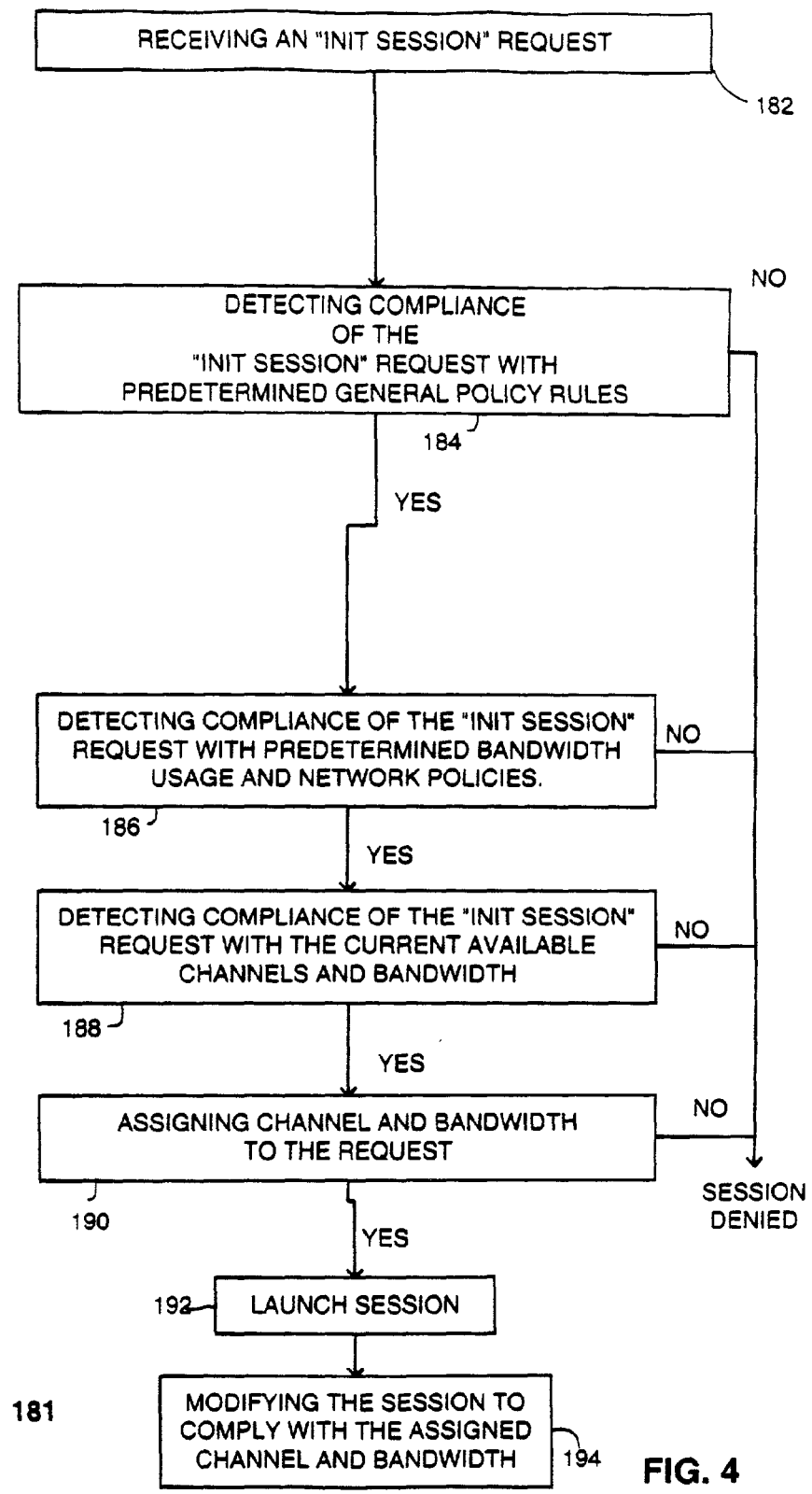
FIG. 4 is an illustration of a method for operating the session management architecture of FIG. 3 of the systems of FIGS. 2A–2B, operative in accordance with further preferred embodiments of the present invention.

Reference is now made to FIG. 4, which is an illustration of method 181 for operating session management architecture 150 of BMS 36, operative in accordance with another preferred embodiments of the present invention. Method 181 includes steps 182, 184, 186, 188, 187, 190, 192 and 194.

Method 181 starts at step 182, in which a session initialization request is detected. With reference to FIG. 3, session manager 102 receives an init-session request, as described herein above. As some of the sessions can involve transmitting application packets, a request for initiating such a session can be (i) generated in response to a request to view a program that is not currently viewed by another member of a service group, (ii) initiated when new application packet are provided by a service application, (iii) when a first member of a service group activates his set-top-box, and the like. Conveniently, when a session to transmit application packets is requested, step 182 is preceded by a step of determining which application packets to transmit during the session. According to an aspect of the invention a single session is opened to allow a sequential transmission of an application packet group.

Step 182 is followed by step 184 in which compliance of the session initialization request with predetermined general policy rules, is detected. With reference to FIG. 3, session manager 102 checks compliance of the requested session with policy records of database 141. If such compliance is not detected, then the session is denied.

In step 186, compliance of the session initialization request with predetermined bandwidth usage and network policies, is detected. With reference to FIG. 3, session manager 102 determines if the requested session can be approved according to a plurality of parameters such as network policies in the network database 149, target policies in target database 143, general policies in the policy database 141, application manager policies in the external application database 147, additional information resources 148, and the like. If such compliance is not detected, then the session is denied.

In step 188, compliance of the session initialization request with the current available channels and bandwidth, is detected. With reference to FIG. 3, shared area manager 144$_r$ checks compliance of the session with channels and bandwidth, which are currently available in the potential path of the session. Said path includes the communication link coupling the members of service group 35$_r$ to BMS 36.

If a compliance of the session initialization request with the current available channels and bandwidth is not detected, then the session is denied. It is noted that step 188 can further include dynamic reallocating of network resources so as to make channels and bandwidth available to the requested session.

In step 190, channel and bandwidth are assigned to the requested session. With reference to FIG. 3, shared area manager 144$_r$ assigns channel and bandwidth to the requested session, which is then launched during step 192. Launching a session according to claim 192 includes programming the selected input module, the switch 274 and the selected output module. It is noted that the bandwidth utilization collector 104 can also be updated accordingly.

In further detail, the DNR manager 106 performs channel and frequency switching (in hardware), and dynamically changes the amount of channels that are dedicated to each group of nodes, according to the bandwidth usage across groups of nodes. This allocation can be dynamic as long as the total number of dedicated channels does not exceed the maximum frequency band that is physically achievable within any service group.

Figure 5:
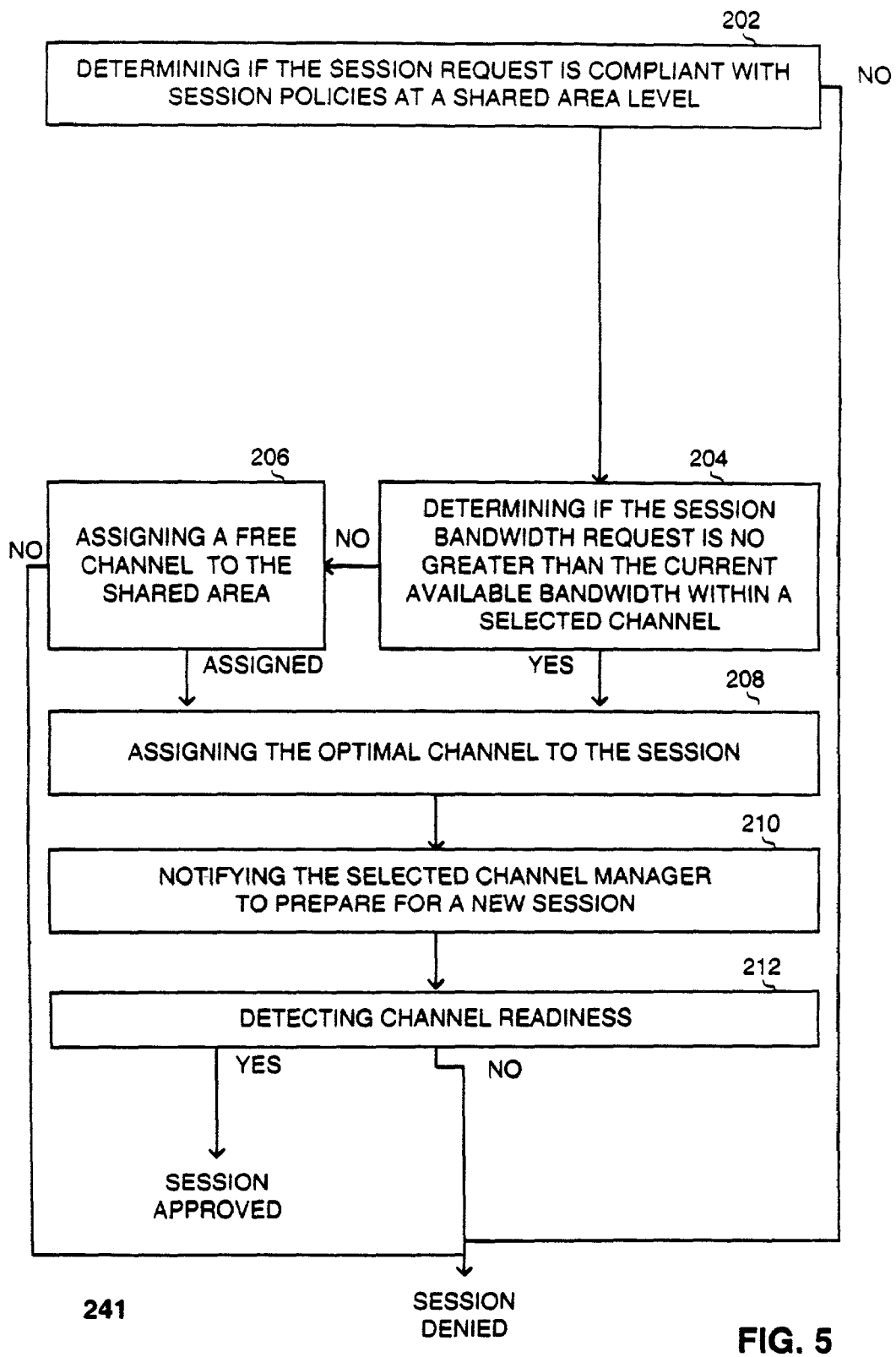
FIG. 5 is an illustration of a method for operating the area managers of FIG. 3 operative in accordance with a further preferred embodiment of the present invention.

Reference is now made to FIG. 5, which is an illustration of method 241 for operating shared area manager 144$_r$ of FIG. 3, operative in accordance with a further preferred embodiment of the present invention. It is noted that shared area manager 144$_r$ is preferably a logical module, which is used to manage a physical shared area, to which a plurality of nodes are connected.

In step 202, compliance of the initialization session request against session policies at a shared area level, is determined. If such compliance is not determined, then the session is denied.

In step 204, the session bandwidth request, respective of the initialization session request, is compared with the current available bandwidth within a selected channel. It is noted that a conventional session can run over one or more channels, where each channel has to be able to provide a predetermined bandwidth. Accordingly, If the session bandwidth request is greater than the current available bandwidth with respect to selected channels, then session request proceed to step 206, else session request proceed to step 208.

In step 206, a free channel is assigned to the current shared area where one is available. This assignment is performed by the DNR 106, as will be described herein below. If such assignment fails, then the session request is denied.

In step 208, an optimal channel is assigned to the session, based on session content type & load balancing network policy. Optimization schemes for managing the load can be determined according to various considerations and can be set by the system operator.

In step 210, the selected channel manager is notified to prepare for a new session. The channel manager adds, by means of multiplexing, this new session to the sessions, which are currently present in that channel. It is noted that this notification can further include session parameters, which are directed at reducing the bandwidth of that session or other selected sessions in the channel.

Figure 6:
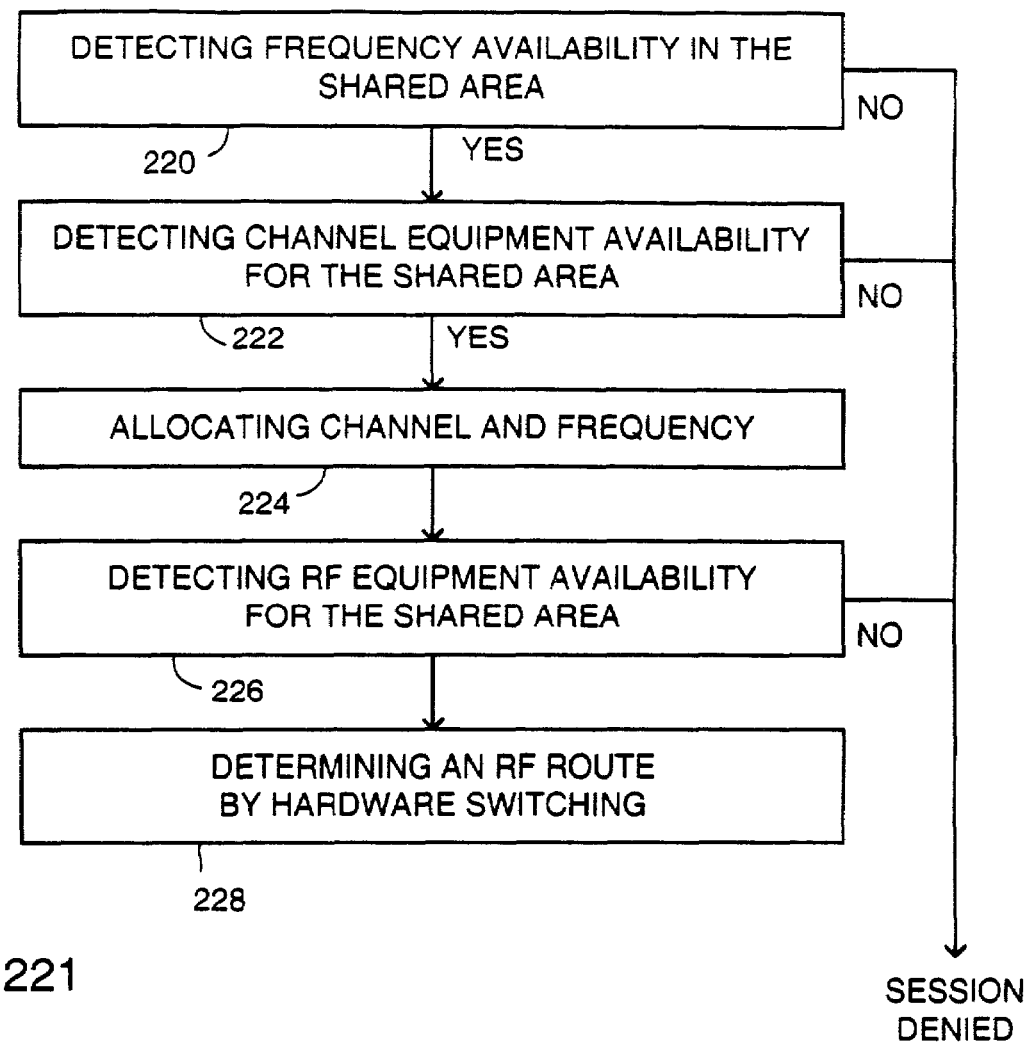
FIG. 6 is an illustration of a method for operating a dynamic network resources manager, operative in accordance with a further preferred embodiment of the present invention.

In step 212, the channel readiness is determined. If the channel is not ready, then the session request is denied. Otherwise, the session request is approved Reference is now made to FIG. 6, which is an illustration of method 221 for operating the DNR manager 106, operative in accordance with another preferred embodiment of the present invention. In step 220, bandwidth availability in the shared area, is detected. The bandwidth availability is detected with respect to the frequency bandwidth which is regularly available, and with respect to the currently running application, applications which are scheduled to run during the anticipated time frame of the session request, and other considerations such as bandwidth, which has to be reserved, and the like. If frequency bandwidth is not available, according to the session request, then the session request is denied.

In step 222, availability of channel equipment at the shared area (hardware) is detected. Such channel equipment can include for example an available QAM unit. If such channel equipment is not available, then the session request is denied.

In step 224, channel and frequency are allocated. With reference to FIG. 3, dynamic network restructuring unit 106 operates a selected QAM unit, to modulate the soon to be running session, at a selected frequency bandwidth.

In step 226, RF equipment availability is located for the shared area. Such RF equipment is for example an available input port at a functioning RF combiner. If such RF equipment, which meets the requirements of the session request, is not available, then the session request is denied.

In step 228, an RF route is determined by hardware switching. With reference to FIG. 3, dynamic network restructuring unit 106 operates RF switch 120 to connect a selected QAM of QAM array 118, to a selected input port at a selected RF combiner of RF combiner array 122.

Figure 7:
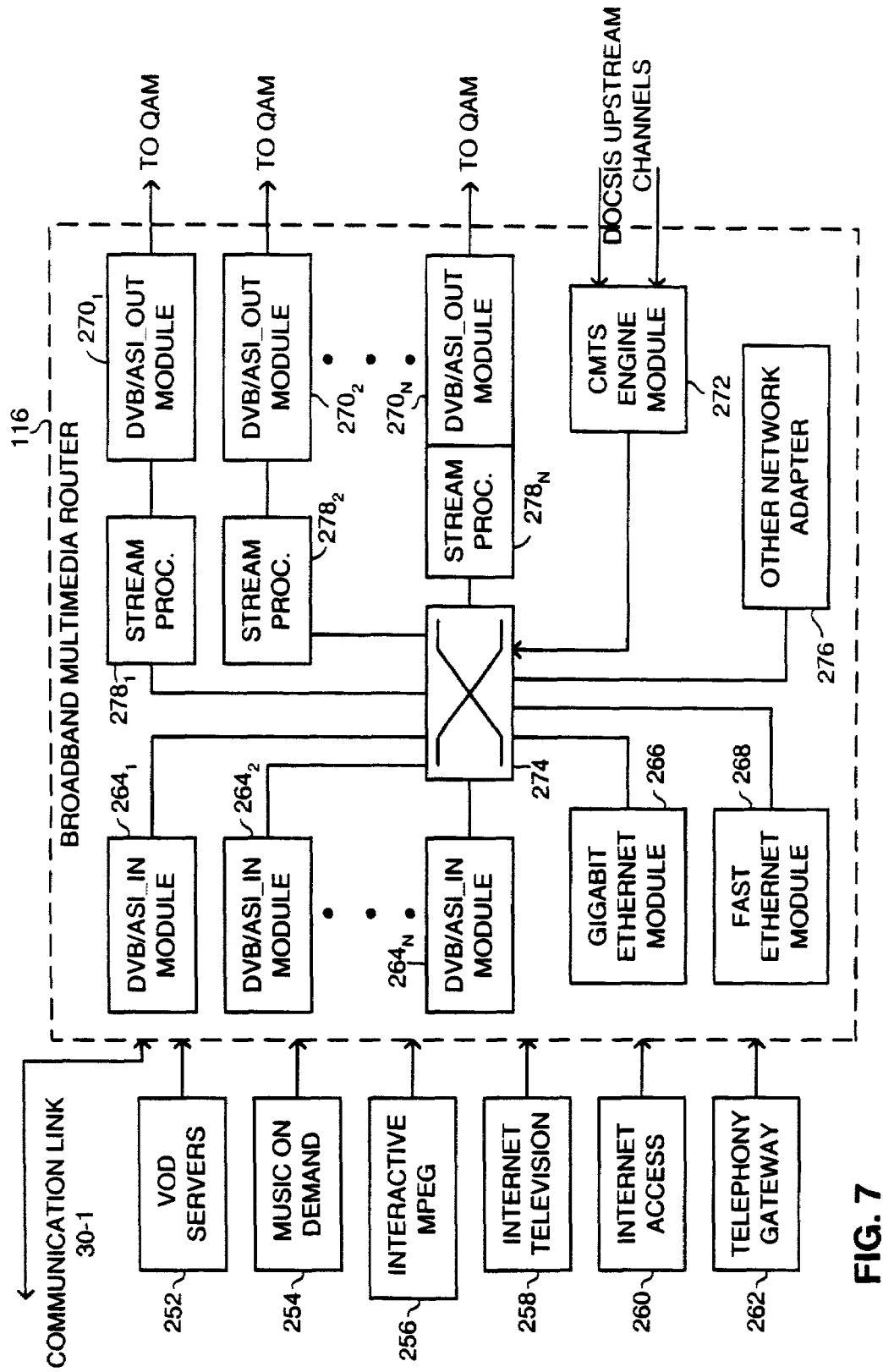
FIG. 7 is a detailed schematic illustration of the router of FIGS. 2A–2B, constructed and operative in accordance with another preferred embodiment of the present invention.

Reference is now made to FIG. 7, which is a detailed schematic illustration of broadband multimedia routers 116, constructed and operative in accordance with further preferred embodiments of the invention.

Broadband multimedia router 116 is operative to direct a variety of packet types, even when a packet does not include destination address information. According to the present invention, broadband multimedia router 116 makes sure that each entering data packet, which does not include destination information, is assigned such information, according to the session directing commands provided by the session manager 102.

Broadband multimedia router 116 is fed by application providers, such as application providers 155 and 117, VOD servers 252, music on demand unit 254, interactive MPEG unit 256, Internet television 258, telephony gateway 262, and the like. Broadband multimedia router 116 includes a plurality of DVB/ASI_IN modules $264_1$, $264_2$ and $264_N$, Gigabit Ethernet module 266, Fast Ethernet module 268, a plurality of DVB/ASI_OUT modules $270_1$, $270_2$ and $270_N$, a plurality of stream processors $278_1$, $278_2$ and $278_N$, and a core switch 274. It is noted that broadband multimedia router 116 further includes an internal controller and intermediate memory means (not shown), for operating and coordinating the various units thereof.

Switch 274 is connected to DVB/ASI_IN modules $264_1$, $264_2$ and $264_N$, Gigabit Ethernet module 266, Fast Ethernet module 268, additional network adapter 276 and CMTS Engine Module 272. Switch 274 is further connected to DVB/ASI_OUT modules $270_1$, $270_2$ and $270_N$, via respective stream processors $278_1$, $278_2$ and $278_N$. DVB/ASI_OUT modules $270_1$, $270_2$ and $270_N$ are further coupled to network interface unit 117, for providing downstream data to end-users via network 30 and BMS.

DVB/ASI_IN modules $264_1$, $264_2$ and $264_N$ are input ports, which receive MPEG transport packets. It is noted that an MPEG transport packet encapsulating elementary media, includes a stream ID, also called PID. Stream processors $278_1$, $278_2$ and $278_N$ are operative to perform stream processing procedures such as multiplexing, re-multiplexing, rate adaptation, PID re-mapping, PCR re-stamping, updating system information embedded in transport streams, and the like. it is noted that stream processors 278 can be considered an integral part of broadband multimedia router 116. It is further noted that some MPEG transport packets are application packets.

The following is an example for a complex routing situation, which is performed by broadband multimedia router 116. DVB/ASI_IN module $264_1$ receives three media streams $S_1$, $S_2$ and $S_3$, having PIDs of 50, 100 and 200, respectively. Media streams $S_1$, $S_2$ and $S_3$ are to be directed to DVB/ASI_OUT modules $270_2$, $270_2$ and $270_1$, respectively. Substantially, at the same time, DVB/ASI_IN module $264_2$ receives four media streams $S_4$, $S_5$, $S_6$, and $S_7$, having PIDs of 100, 120, 200 and 300, respectively. Media streams $S_4$, $S_5$, $S_6$, and $S_7$ are to be directed to DVB/ASI_OUT modules $270_2$, $270_7$ (not shown), $270_1$ and $270_{23}$ (not shown), respectively.

In the present example, core switch 274 is a generic packet switching device and hence every packet provided thereto, has to be in a known addressable packet format. With respect to the media streams received at DVB/ASI_IN module $264_1$, broadband multimedia router 116 encapsulates a packet of media stream $S_1$, in an addressable packet, with destination information respective of the switch port, connected to DVB/ASI_OUT module $270_2$ and its original stream PID 50. Switch 274 directs the produced addressable packet to DVB/ASI_OUT module $270_2$, which opens the encapsulation, reconstructs the media stream packet, and assigns the stream PID provided by broadband multimedia router 116. It is noted that broadband multimedia router 116 can provide a stream PID, which is different from the original stream PID of the packet, as will be described herein below.

Broadband multimedia router 116 encapsulates a packet of media stream $S_2$, in an addressable packet, with destination information respective of the switch port connected to DVB/ASI_OUT module $270_2$ and its original PID 100. Broadband multimedia router 116 encapsulates a packet of media stream $S_3$, in an addressable packet, with destination information respective of the switch port connected to DVB/ASI_OUT module $270_1$ and its original PID 200.

With respect to the media streams received at DVB/ASI_IN module $264_2$, broadband multimedia router 116 encapsulates a packet of media stream $S_4$, in an addressable packet, with destination information respective of the switch port connected to DVB/ASI_OUT module $270_2$ but assigns a new PID 150, since PID 100 is already used for DVB/ASI_OUT module $270_2$, by media stream $S_2$. Here, switch 274 directs the produced addressable packet to DVB/ASI_OUT module $270_2$, which opens the encapsulation, reconstructs the media stream packet, and assigns the stream PID (150) provided by broadband multimedia router 116, which is different than the original stream PID (100). Similarly, broadband multimedia router 116 encapsulates a packet of media stream $S_6$, in an addressable packet, with destination information respective of the switch port connected to DVB/ASI_OUT module $270_1$ but with a new PID 100, since PID 200 is already used for DVB/ASI_OUT module $270_1$ by media stream $S_3$. This procedure is called PID re-mapping.

Broadband multimedia router 116 encapsulates a packet of media streams $S_5$ and $S_7$, in addressable packets, with destination information respective of the switch port connected to DVB/ASI_OUT modules $270_7$ and $270_{23}$, with their respective original PIDs 120 and 300.

The above routing procedure is performed according to specific instruction provided by the session manager 102, for example, by means of a routing table. In case of an MPEG transport packet, broadband multimedia router 116 accesses the routing table according to the stream PID of that packet, and the DVB/ASI_IN module identification, which was received, and retrieves the predetermined destination associated therewith. It is noted that the predetermined destination is respective of the combination of the packet stream PID, and the respective DVB/ASI_IN module identification.

A data packet received from Gigabit Ethernet module 266, or from Fast Ethernet module 268, is typically an addressable packet and hence already contains destination information. This data packet can be directed to a respective output port of the switch, according to that destination information. It is noted that session manager 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like. Such stream processing procedures are usually carried in an outgoing route of broadband multimedia router 116 (e.g., either in switch 274, in one of the output modules 270, 266 and 268, or in the route there between, by specific modules). In the present example, each of the DVB/ASI_OUT modules 270 is also operative to encapsulate other types of data in MPEG transport format, perform statistical multiplexing, and stream rate adaptation, to adapt the bandwidth and quality of the media stream to the available network resources.

CMTS Engine Module 272 receives data over MPEG transport from the end-user in the upstream direction, transforms it to IP format and provides it to the switch 274, for directing to an IP module such as Gigabit Ethernet module 266, or Fast Ethernet module 268. CMTS Engine Module 272 further transmits DOCSIS downstream information to the end-user via DVB/ASI_OUT modules 270.

Additional network adapter 276 is operative to connect to various network types such as ATM, SONET, and the like.

Figure 8:
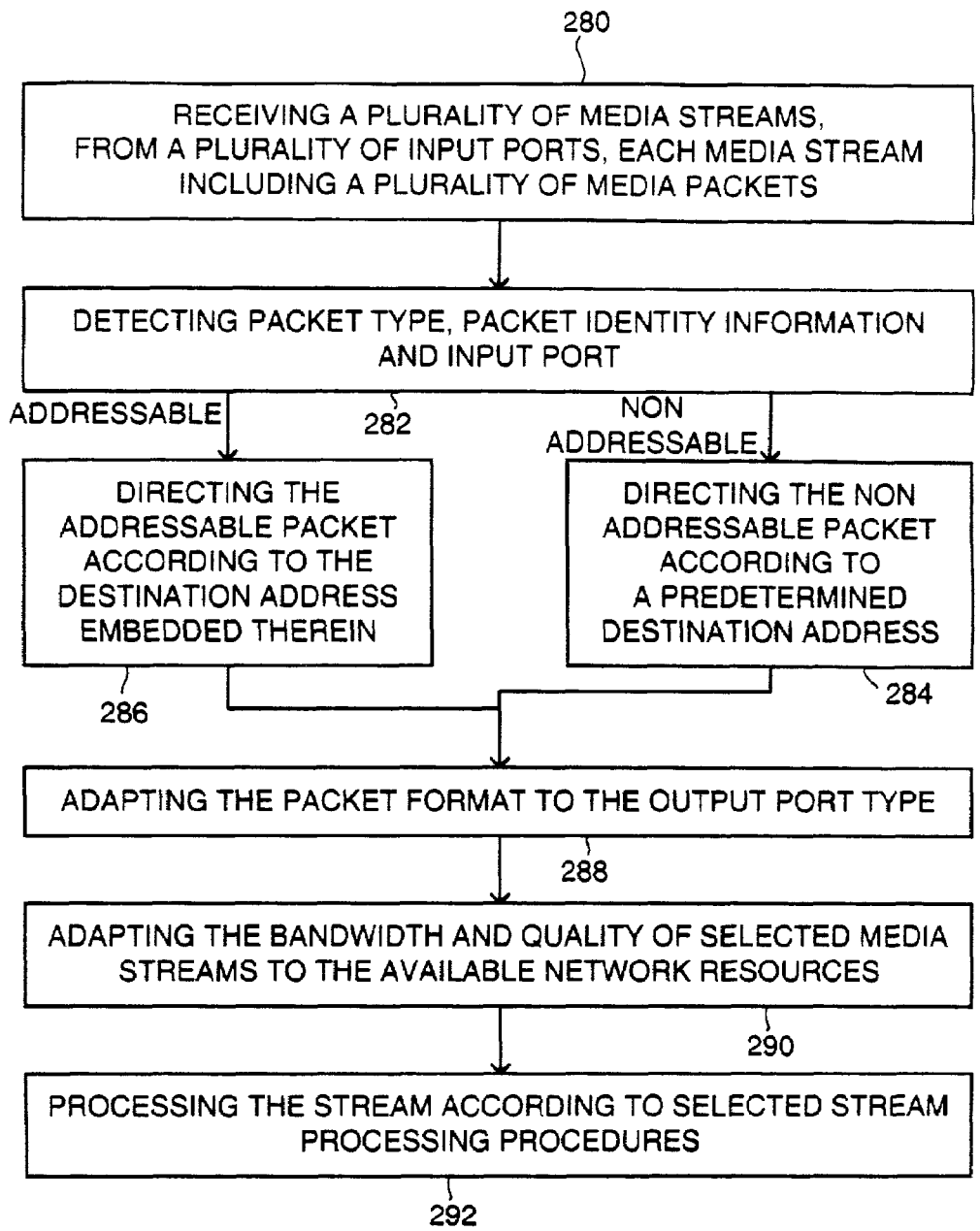
FIG. 8 is an illustration of a method for operating the routers of FIG. 7, operative in accordance with a further preferred embodiment of the present invention.

Reference is now made to FIG. 8, which is an illustration of method 281 for operating broadband multimedia router 116, operative in accordance with another preferred embodiment of the present invention. In step 280 a plurality of media streams are received from a plurality of input ports, where each media stream includes a plurality of media packets. These media streams can include video streams, audio streams, data streams and the like. With reference to FIG. 7, DVB/ASI_IN modules $264_1$, $264_2$ and $264_N$, Gigabit Ethernet Module 266, and Fast Ethernet module 268 receive a plurality of media streams from VOD Servers 252, music on demand 254, interactive MPEG 256, Internet television 258, Internet access 260, telephony gateway 262, and the like.

In step 282 the type of a selected packet, its identity and the input port in which it was received, are detected. These media streams are generally divided in two types, which are addressable media streams and non-addressable media streams. An addressable media stream includes specific destination information, which is typically embedded in each of its packets, such as in IP packet, Ethernet packet, and the like. Such destination information is used to direct each packet to the final destination, and do so at different routes for each packet. A non-addressable media stream does not include specific destination information, such as MPEG transport elementary stream, which only includes a packet identification code, indicating that the stream packets belong to the same stream. With reference to FIG. 7, broadband multimedia router 116 determines the packet type, according to the type of input port it was received in. A packet received in a DVB/ASI_IN module 264 is a non-addressable multimedia stream oriented packet (e.g. video, audio or data over multi-media transport standards such as IP over MPEG transport). A packet received in Gigabit Ethernet module 266 or from Fast Ethernet module 268 is an addressable media stream oriented packet, such as an IP packet. The identity and input port information is stored and used in the routing process of each packet. If the packet is non-addressable media stream oriented, then the method proceeds to step 284. Otherwise, if the packet is addressable media stream oriented, then the method proceeds to step 286.

In step 284, a non-addressable packet is directed according to a predetermined destination address. Hence, a non-addressable media stream packet is temporarily converted into an addressable media stream packet, which hence, can be directed. The destination address is provided by the session manager 102, and is retrieved momentarily according to the packet stream identification, and according to the identification of the input port, which received it. It is noted that a packet can have more than one destination address. This is known as multicast.

In step 286, an addressable packet is directed according to a destination address embedded therein. It is noted that this address can further be translated to another predetermined destination address provided by the session manager 102.

In step 288, the packet format is adapted to conform to the type of the output port. If the routing was performed on data oriented packets, such as IP packets, and the output port type is DVB/ASI, then the packet is converted as follows: a stream oriented packet which was encapsulated in an IP packet format, is reconstructed. A data oriented packet is converted to (encapsulated in) MPEG transport format packets.

In steps 290 and 292, the bandwidth and quality of selected media streams are adapted to meet the available network resources and the stream is processed according to selected stream processing procedures, such as multiplexing, re-multiplexing, rate adaptation, PID re-mapping, PCR re-stamping, updating system information embedded in transport streams, and the like. With reference to FIG. 7, these operations are performed by DVB/ASI_OUT modules 270 and stream processors 278.

This technique of enabling non addressable media stream switching (such as MPEG) provides several advantages such the enhanced sharing of bandwidth among several sessions, the mere mixing of addressable media streams with non addressable media streams, enhanced hardware and bandwidth utilization and more.

Figure 9:
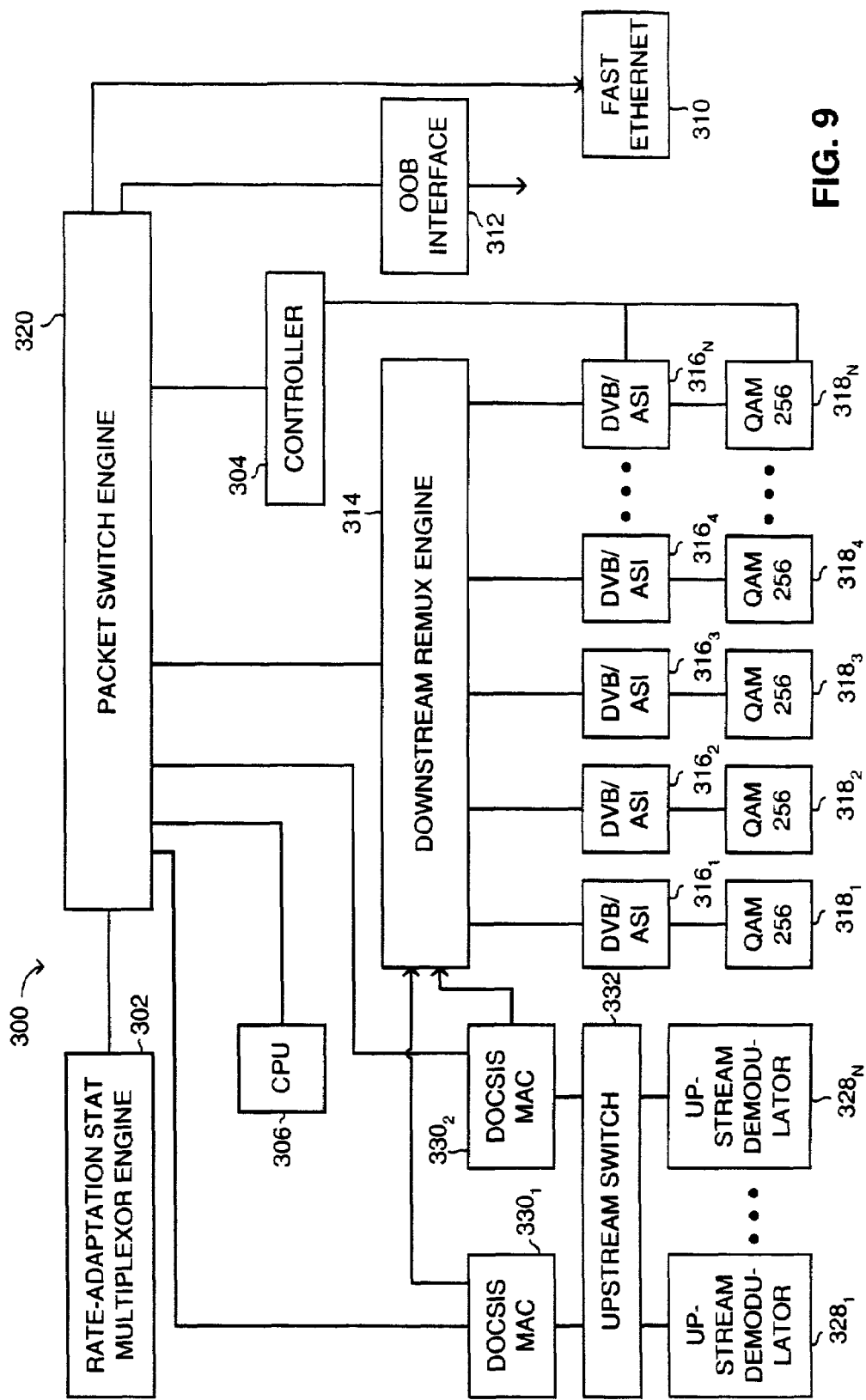
FIG. 9 is a schematic illustration of a packet switch system, constructed and operative in accordance with another preferred embodiment of the present invention.

Reference is now made to FIG. 9, which is a schematic illustration of a packet switch system, generally referenced 300, constructed and operative in accordance with a further preferred embodiment of the invention. System 300 can be functionally located within a hub, for switching and converting various types of data packets.

System 300 includes a packet switch engine 320, a rate-adaptation statistical-multiplexer engine 302, a controller 304, a CPU 306, Fast Ethernet interface 310 and an out-of-band interface 312 to the out-of-band manager (not shown), a downstream re-multiplexer engine 314, and a plurality of DVB/ASI modules $316_1$, $316_2$, $316_3$, $316_4$ and $316_N$. System 300 further includes a plurality of QAM units $318_1$, $318_2$, $318_3$, $318_4$ and $318_N$, two DOCSIS MAC units $330_1$ and $330_2$, an upstream switch 332, and a plurality of upstream demodulators $328_1$ and $328_N$.

Packet switch engine 320 is connected to rate-adaptation statistical-multiplexer engine 302, controller 304, downstream re-multiplexer engine 314, Fast Ethernet interface 310, out-of-band interface 312, CPU 306 and DOCSIS MAC units $330_1$ and $330_2$. Downstream re-multiplexer engine 314 is further connected to DVB/ASI modules $316_1$, $316_2$, $316_3$, $316_4$ and $316_N$. Each DVB/ASI module 316 is further connected to a respective QAM unit $318_1$, $318_2$, $318_3$, $318_4$ and $318_N$. Upstream switch 332 is connected between upstream demodulators $328_1$ and $328_N$, and DOCSIS MAC units $330_1$ and $330_2$. Each output channel directed through a selected DVB/ASI module, is operative to transmit a plurality of video sessions, as well as a plurality of DOCSIS sessions, at the same time.

Each of the upstream demodulators $328_1$ and $328_N$ performs down-conversion, and demodulation to upstream channels received from an end-user. The upstream switch 332 receives a plurality of upstream channels from upstream demodulators $328_1$ and $328_N$, each carrying DOCSIS return path information. The upstream switch 332 is operative to direct each of the received upstream channels, to each of the DOCSIS MAC units $330_1$ and $330_2$, thereby providing improved bandwidth efficiency, and better redundancy and reliability for the upstream functionality. This architecture allows the upstream resources to be dynamically allocated to each of DOCSIS MAC units $330_1$ and $330_2$. When noise or other errors appear on a specific upstream channel, switch 332 can dynamically change the upstream channel allocation.

DOCSIS MAC units $330_1$ and $330_2$ provide packets received from upstream switch 332, either to downstream re-multiplexing engine 314 or to packet switch engine 320, depending on the packet content type and original destination. Downstream re-multiplexer engine 314 performs data encapsulation, statistical multiplexing and video rate adaptation and multiplexing.

System 300 can further perform load balancing of outgoing transmission of various types, at the same time and through the same outgoing channels, such as a plurality of video streams and a plurality of DOCSIS sessions, transmitted over the same DVB/ASI modules 316. CPU 306 determines and controls the load balancing between such competing elements and provides parameters there according, to downstream re-multiplexing engine 314, rate adaptation statistical multiplexer engine 302 and DOCSIS MAC units $330_1$ and $330_2$.

For example, a video stream and a DOCSIS session, which are transmitted over one of the DVB/ASI modules 316 initially separated to various quality levels (described herein below in conjunction with FIGS. 10A–10K), where the first quality level denotes a minimal quality which has to be provided at all times. Higher quality levels can be provided when sufficient bandwidth is available therefore. It is therefore noted that the first quality level has the highest transmit priority.

DOCSIS sessions can be categorized according to quality of service associated therewith or assigned thereto. For example, an Email session would normally be characterized by a low level of quality of service, and telephony sessions would normally be characterized by a high level of quality of service. CPU 306 constantly detects the load status of the system 300 and dynamically assigns transmit priority to the DOCSIS sessions processed by DOCSIS MAC units $330_1$ and $330_2$. Hence, when system 300 is significantly loaded by video sessions, some non real time sessions such as DOCSIS Email sessions can be delayed or assigned narrower bandwidth, while real time sessions, such as telephony sessions are forced into the transmit route, even at the expense of further degrading the quality of currently transmitting video sessions towards their first quality level.

Packet switch engine 320 receives different types of information via different input modules, such as Fast Ethernet interface 310 (coupled to the Internet or to similar networks), or out-of-band interface 312. Packet switch engine 320 analyzes the nature of the received streams simultaneously, and directs them according to a decision scheme illustrated herein below in conjunction with FIG. 13. Controller 304 controls the operation of the packet switch engine 320.

The rate-adaptation statistical-multiplexer engine 302, performs statistical multiplexing as well as rate adaptation when required, to elementary streams, before they are directed by the switch 320. CPU 306 is the central processing unit of the system, and can be supported in a cluster by other CPUs for increased system redundancy.

Figure 10:
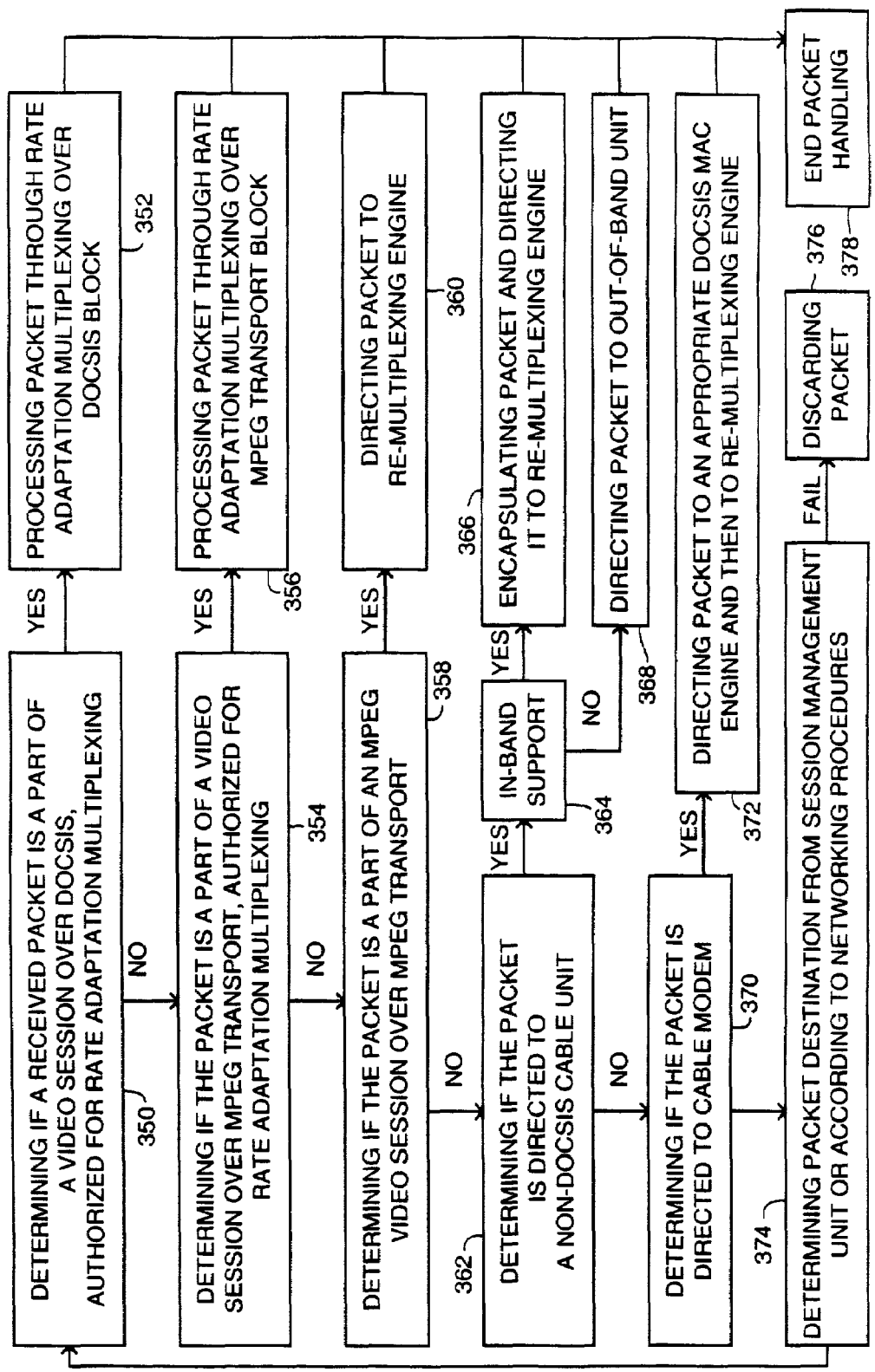
FIG. 10 is a schematic illustration of a method for operating the system of FIG. 9, operative in accordance with a further preferred embodiment of the present invention.

Reference is now made to FIG. 10, which is a schematic illustration of a method for operating system 300 of FIG. 9, operative in accordance with another preferred embodiment of the present invention.

In step 350, a received packet is analyzed to determine if it is a part of a video session over IP over DOCSIS, authorized for rate adaptation multiplexing. If so, then the packet is rate adapted (when required) and multiplexed over a DOCSIS block (step 352). With reference to FIG. 10, the packet is directed to module 302, where such operations are performed, and then further directed to DOCSIS MAC units 330 for further direction to the downstream re-multiplexing engine 314. Otherwise, the method proceeds from step 354.

In step 354, the received packet is further analyzed to determine if it is a part of a video session over MPEG transport, authorized for rate adaptation multiplexing. If so, then the packet is rate adapted (when required) and multiplexed over an MPEG transport block (step 356). With reference to FIG. 9, the packet is directed to module 302, where such operations are performed and further directed to downstream re-multiplexing engine 314. Otherwise, the method proceeds from step 358.

In step 358, the received packet is further analyzed to determine if it is a part of an MPEG video session over MPEG transport. If so, then the packet is directed to the cable system (step 360). With reference to FIG. 9, the packet is directed to downstream re-multiplexing engine 314. Otherwise, the method proceeds from step 362.

In step 362, the received packet is further analyzed to determine if its destination is a non-DOCSIS cable unit (for example an IP packet). If so, and the destination non-DOCSIS cable unit includes In-Band support for IP data (step 364), then the packet is encapsulated and re-multiplexed (step 366), before it is sent to that destination non-DOCSIS cable unit. But if the destination non-DOCSIS cable unit does not include In-Band support (step 364), then the packet is directed to the Out-Of-Band unit (step 368).

With reference to FIG. 9, since the packet is not a video packet, it is either encapsulated in MPEG transport and sent to the cable network via re-multiplexing engine 314, (step 366) when the receiving non-DOCSIS cable unit includes In-Band support, or sent through the Out-Of-Band via out-of-band interface 312 (step 368).

In step 370, the received packet is further analyzed to determine if its destination is a cable modem. If so then the packet is directed to the cable network via DOCSIS MAC with re-multiplexing. With reference to FIG. 8, the packet is directed to appropriate DOCSIS MAC engine 330, and then directed to the cable network via re-multiplexing engine 314.

In step 374, a final attempt is performed to classify the packet and determine its destination. If this attempt fails then the packet is discarded (step 376). With reference to FIG. 9, after the packet could not be classified, as described above, the session manager 102 is accessed to attempt to determine the packet destination. Further query procedures via conventional networking can also be performed at this time, for the same purpose. If the attempt to determine the destination of the packet fails, then the packet is discarded (step 376). Otherwise, the packet is directed to its destination and the method repeats from step 350 for the next packet.

It is noted that at the end of steps 352, 356, 360, 366, 368 and 370, the packet is substantially transmitted out of the routing system, and hence need not be handled anymore, thereby (step 378).

Figure 15:
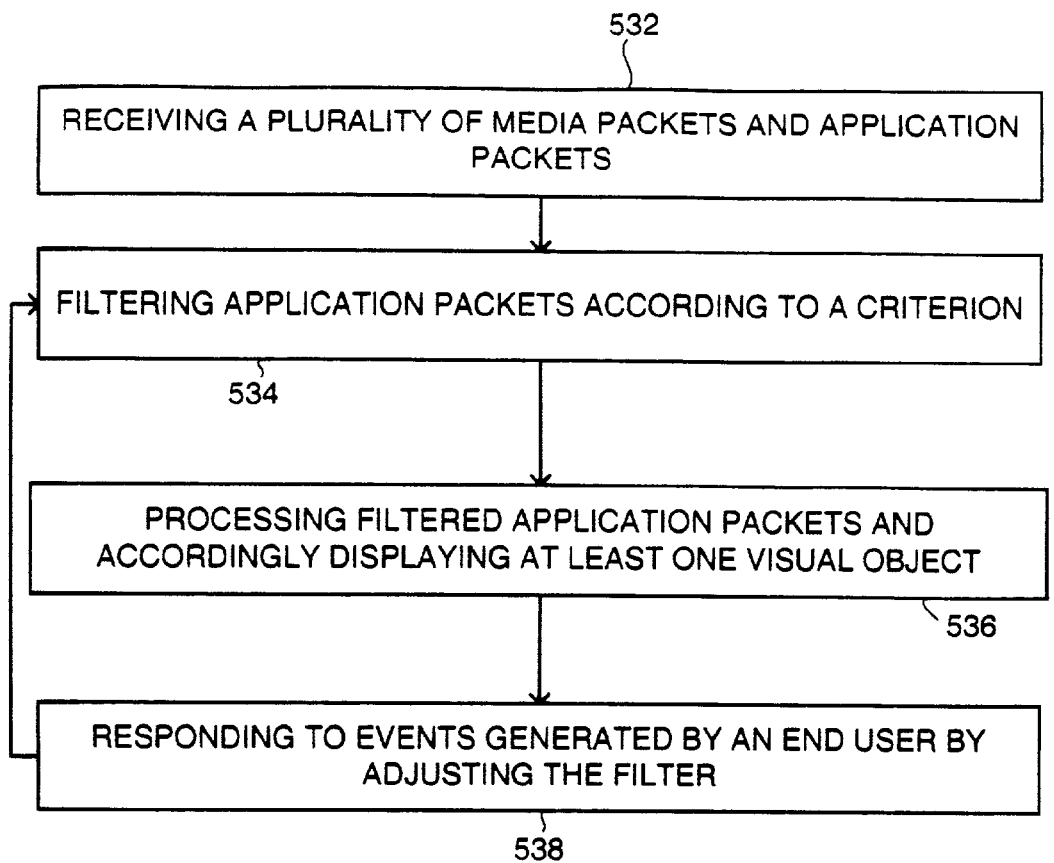
FIG. 15 is a flow chart illustrating a method for executing an application by an end-users, in accordance with a preferred embodiment of the invention.

Reference in now made to FIG. 15, illustrating method 530 for executing an application by an end-users. The execution involves displaying visual objects on an end-user display unit and reacting to events initiated by an end-user.

Method 530 starts by step 532 of receiving a plurality of media packets and application packets. Referring to the example set forth in FIG. 1, STB 132 receives media packets and application packets via tuner 152.

Step 532 is followed by step 534 of filtering application packets according to a criterion. The criterion can reflect an application priority, an application that is related to a program displayed or provided to an end-user, and the like. Referring to the example set forth in FIG. 1, the received media packets and application packets are provided to MPEG parser 153 that filters the packets according to their PN/PID. Application packets have a unique PID that causes MPEG parser 153 to provide them to processor 150. ITC identifies the application packets and filters the application packets according to their IID. The filtering process allows to "pass" only application packets that are related to the same video object (or set of video objects that are displayed at the same time on the end-users television set) and application packets that allow to respond to events related to the displayed visual objects, and application packets allowing for manipulating the visual objects. For example, an application can start by displaying visual objects $610_1$–$610_4$ and accordingly only application packets $400_1$–$400_N$ "pass" the filtering process and are processed by processor 150. The filtering can change in response to events initiated by the end-user. For example, if an end-user selects "hot key" 6103, the filter is configured to "pass" application packets $402_1$–$402_N$.

Step 534 is followed by step 536 of processing the filtered application packets and accordingly displaying a visual object. Conveniently, the filtered application packets can allow for manipulating the visual objects.

Step 536 is followed by step 538 of responding to events generated by an end-user by adjusting the filter for filtering application packets. Conveniently, the response can also include transmitting upstream information. The transmission is usually made in response to only some of the events, or the display of some visual objects. Usually, the execution of an application requires that a sequence of visual objects is displayed and upstream information is transmitted only in response to some of the visual objects. For example, when an end-user is required to confirm a purchase, to enter his credit card details and the like. The latter details can also be stored in a database accessible by the application server such that the end-user is not required to enter said details more than once.

Figure 16:
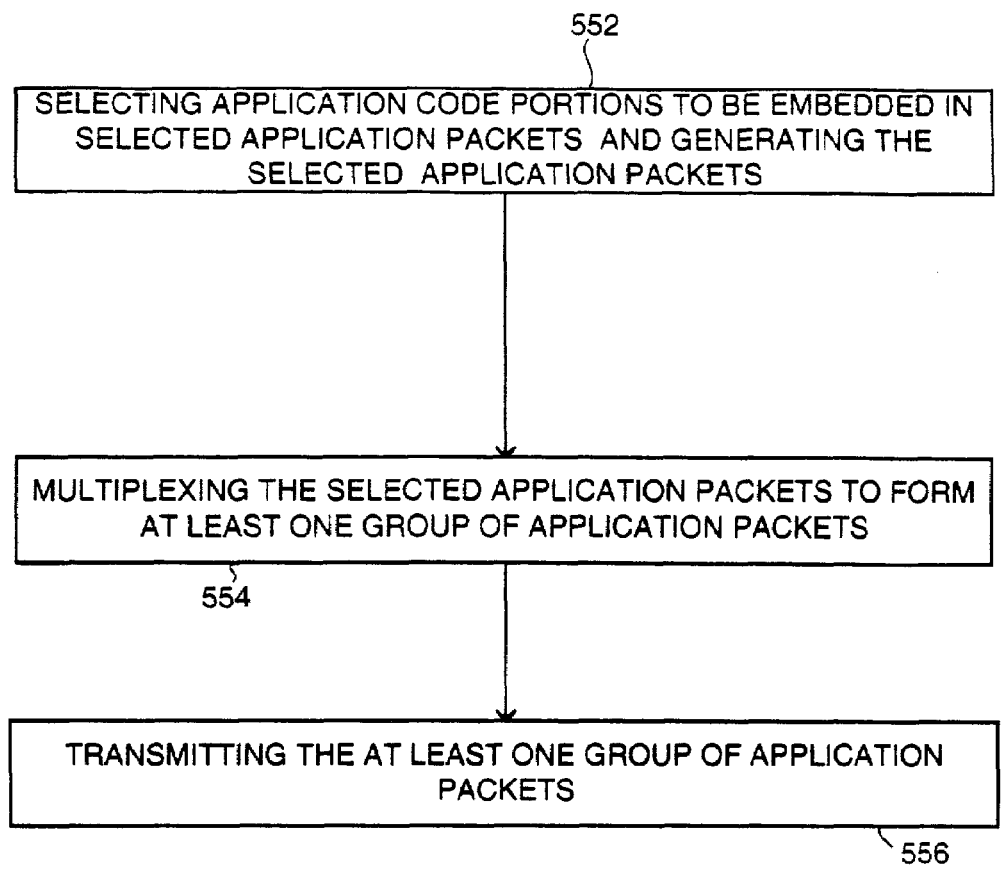
FIG. 16 is a flow chart illustrating a method for generating and providing application packets to end-users, in accordance with a preferred embodiment of the invention.

Reference is now made to FIG. 16 illustrating method 550 for generating and providing application packets to end-users, each end-user has a display unit and a control unit, the control unit configured to control the display unit.

Method 550 including the step 552 of selecting application code portions to be embedded in selected application packets and generating the selected application packets. Referring to the example set forth in previous figures, such as FIG. 12, the content of an application packet group can be responsive to various parameters, such as media packets provided to the same end-users, end-user profile, end-user viewing patterns, and the like. It is noted that application packets belonging to more than a single group can be selected. For example, during step 552 a plurality of application packets, destined to the same group of end users may be selected. These application packets are referred to as group-associated application packets. Conveniently, the generation includes a step of embedding selected application code portions in application packets and generating application packet headers, such as the header disclosed in FIG. 13.

According to another aspect of the invention the application packets are generated and stored at a storage means, such as a storage unit of an application packet. In such a case the selection of selected application packets can include a selective retrieval of the selected application packets from the storage unit.

Step 552 is followed by step 554 of multiplexing the selected application code portions to form at least one application packet group. The control unit of each end-user is configured to process the application packets of an application packet group out of the at least one application packet groups, and accordingly (i) display at least a portion of a visual object on the display unit, or (ii) react to events that are related to the display of the at least portion of the visual object on the display unit.

Usually, step 554 is followed by step 556 of transmitting the selected application packets. Usually the application packets are further multiplexed with media packets to form a multiplexed sequence. The transmission can be more efficient if the transmission is preceded by a step of tracking the reception characteristics of end users, such as end-users tuners frequency range.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. System for provision of media packets and application packets to at least one group of end-users, each end-user has a display unit and a control unit for controlling the display unit, the system comprising:
   a router, coupled to the control unit of the end-users, the router operative to receive application packets and media packets, and to provide group-associated application packets and media packets to control units of a group of end-users;
   a session manager, coupled to the router, the session manager providing routing instructions to said router, for dynamically selecting group-associated application packets and media packets out of the received application packets and media packets;
   wherein the control unit of each end-user is configured to process the application packets and accordingly (i) display at least a portion of a visual object on the display unit, or (ii) react to events that are related to the display of the at least portion of the visual object on the display unit; and, wherein some of the application packets and some of the media packets are non-addressable packets, wherein some media packets are addressable packets, wherein the router comprising:

a plurality of input ports, including at least one non-addressable stream input port;

a plurality of non-addressable stream output ports;

a multiple port switch, connected between said non-addressable stream input ports and said non-addressable stream output ports;

said multiple port switch directing a non-addressable application packets and media packets, received from a selected one of said at least one non-addressable stream input ports, to at least a selected one of said at least one non-addressable stream output ports, said multiple port switch selecting said selected non-addressable stream output port according to the type and identity of said selected non-addressable stream input port and the identity information embedded in said non-addressable application packet.

2. The system according to claim 1, further comprising at least one addressable stream communication port, connected to said multiple port switch, said multiple port switch directing an addressable media packet, received from a selected one of said at least one addressable stream communication ports, to at least a selected one of said at least one non-addressable stream output ports.

3. The system according to claim 1, wherein the selected non-addressable stream output port encapsulates an addressable media packet in a non-addressable stream packet, when the addressable packet is received from one of said at least one addressable stream input ports.

4. The system according to claim 1, wherein MPEG transport packets are encapsulated into communication packets respective of the communication protocol of said multiple port switch.

5. The system according to claim 1, wherein said at least one non-addressable stream input port comprises a multiple program transport interface and wherein said at least one non-addressable stream output port comprises a multiple program transport interface.

6. The system according to claim 1, further comprising a plurality of stream processors, each said stream processor being connected between said multiple port switch and a respective one of said non-addressable stream output ports.

7. The system according to claim 1 wherein the control unit is a digital set-top-box.

8. The system according to claim 1 wherein application packets are arranged in at least one application packet group; wherein each application packet group comprises application packets allowing for executing an application.

9. The system according to claim 1 wherein application packets comprise an identification IID field.

10. The system according to claim 1 wherein at least some of the application packets comprise a display period field.

11. The system according to claim 1 wherein at least some of the application packets comprise a bit map of a portion of a visual object.

12. The system according to claim 1 wherein at least some of the application packets further comprise a location field indicative of a location of the portion of the visual object on the display unit.

13. The system according to claim 1 wherein at least one application packet embeds a portion of a code for displaying an advertisement.

14. A method for providing application packets to at least one group of end-users, the method comprising the steps of:

receiving application packets and media packets;

dynamically selecting, for each group of end-users, group-associated media packets and application packets;

providing to each group of end-users, out of the at least one group of end-users, the corresponding group-associated media packets and application packets;

wherein application packets allow either for displaying at least a portion of a visual object on a display unit, or for reacting to events that are related to the display of the at least portions of the visual objects on the display unit;

wherein at least some of the media packets and the application packets are non-addressable packets; and wherein the method further comprising the steps of:

receiving non-addressable packets from an input port selected from at least one non-addressable stream input port;

dynamically selecting packets out of the received packets to be provided to at least one of a plurality of non-addressable stream output ports; whereas at least one non-addressable stream output port is coupled to at least one group of end-users; and directing said non-addressable packets to said selected non-addressable stream output port.

15. The method according to claim 14 wherein the selection is responsive to the type and identity of said selected input port and the identity information embedded in said received packet.

16. The method according to claim 14, wherein said input port is further selected from at least one addressable stream input port.

17. The method according to claim 14, further comprising the step of prioritizing the directing of the session associate with said received packet.

18. The method according to claim 14, further comprising the step of encapsulating said packet in a non-addressable stream packet, when said packet is received from one of said at least one addressable stream input ports.

19. The method according to claim 14, further comprising the step of encapsulating said packet in a addressable stream packet, when said packet is received from one of said at least one non-addressable stream input ports.

20. The method according to claim 1 wherein at least one application packet embeds a portion of a code for displaying an advertisement.

* * * * *